(12) United States Patent
Cho et al.

(10) Patent No.: US 8,605,242 B2
(45) Date of Patent: Dec. 10, 2013

(54) LIQUID CRYSTAL DISPLAY

(75) Inventors: Seon-Ah Cho, Busan (KR); Jang-Kun Song, Seoul (KR); Hyun-Wuk Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 358 days.

(21) Appl. No.: 12/902,465

(22) Filed: Oct. 12, 2010

(65) Prior Publication Data

US 2011/0096282 A1 Apr. 28, 2011

(30) Foreign Application Priority Data

Oct. 28, 2009 (KR) .................. 10-2009-0102979

(51) Int. Cl.
*G02F 1/1337* (2006.01)
*G02F 1/136* (2006.01)
*G02F 1/1343* (2006.01)

(52) U.S. Cl.
USPC .................. 349/129; 349/48; 349/144

(58) Field of Classification Search
USPC .................... 349/129, 144, 48
See application file for complete search history.

(56) References Cited

U.S. PATENT DOCUMENTS

| | | | | |
|---|---|---|---|---|
| 7,903,217 | B2 * | 3/2011 | Hsu et al. ............. | 349/129 |
| 8,035,787 | B2 * | 10/2011 | Jung et al. ............. | 349/141 |
| 8,294,860 | B2 * | 10/2012 | Yoshida et al. ........... | 349/129 |
| 8,451,393 | B2 * | 5/2013 | Cho et al. ............. | 349/38 |
| 2002/0118329 | A1 * | 8/2002 | Koma ............. | 349/130 |
| 2003/0107694 | A1 * | 6/2003 | Song ............. | 349/129 |
| 2004/0125302 | A1 | 7/2004 | Kim | |
| 2005/0007532 | A1 | 1/2005 | Lee | |
| 2006/0092361 | A1 * | 5/2006 | Kim et al. ............. | 349/139 |
| 2007/0222931 | A1 | 9/2007 | Chang et al. | |
| 2009/0122246 | A1 | 5/2009 | Hsu et al. | |

FOREIGN PATENT DOCUMENTS

| | | |
|---|---|---|
| JP | 2005265891 | 9/2005 |
| JP | 2007052269 | 3/2007 |
| KR | 1020030001891 | 1/2003 |
| KR | 1020030012347 | 2/2003 |
| KR | 1020030042221 | 5/2003 |
| KR | 1020030047366 | 6/2003 |
| KR | 1020070111155 | 11/2007 |

* cited by examiner

*Primary Examiner* — Edward Glick
*Assistant Examiner* — Dennis Y Kim
(74) *Attorney, Agent, or Firm* — Cantor Colburn LLP

(57) ABSTRACT

A liquid crystal display includes a signal line disposed on a substrate, a pixel electrode connected to the signal line and including a first subpixel electrode and a second subpixel electrode, a common electrode disposed opposite the pixel electrode, and a liquid crystal layer disposed between the pixel electrode and the common electrode. The liquid crystal layer is divided into domains including a first direction domain and a second direction domain in a region corresponding to the first subpixel electrode, and a third direction domain and a fourth direction domain in a region corresponding to the second subpixel electrode, and an area of the third direction domain is greater than about twice and less than about then times an area of the fourth direction domain.

19 Claims, 19 Drawing Sheets

LIQUID CRYSTAL DISPLAY

This application claims priority to Korean Patent Application No. 10-2009-0102979, filed on Oct. 28, 2009, and all the benefits accruing therefrom under 35 U.S.C. §119, the content of which in its entirety is herein incorporated by reference.

BACKGROUND OF THE INVENTION (1) Field of the Invention

The following description relates to a liquid crystal display.

(2) Description of the Related Art

Liquid crystal displays ("LCDs") are a widely used type of flat panel display. A liquid crystal display typically includes two display panels, on which field generating electrodes, e.g., pixel electrodes and a common electrode, are formed, and a liquid crystal layer interposed between the two display panels. Voltages may be applied to the field generating electrodes to generate an electric field in the liquid crystal layer, and the alignment of liquid crystal molecules of the liquid crystal layer is determined by the electric field. Accordingly, the polarization of incident light is controlled to display an image.

The liquid crystal display may further include thin film transistors connected to pixel electrodes, and a plurality of signal lines, such as gate lines and data lines, which controls the thin film transistors.

Types of LCDs include a vertical alignment ("VA") mode LCD, which aligns longitudinal axes of liquid crystal molecules to be perpendicular to the two display panels when an electric field is not generated and has high contrast ratio and wide reference viewing angle. In the VA mode LCD, the reference viewing angle indicates a viewing angle that is 1:10 in contrast ratio, or a critical angle of gray-to-gray luminance reversion.

A method of forming a cutout in a field generating electrode of the VA mode LCD, and a method of forming a protrusion above or below the field generating electrode, may be used to achieve a wide viewing angle. The directions to which the liquid crystal molecules are inclined can be determined by the cutouts and the protrusions of the field generating electrodes, and the reference viewing angle may be thereby increased by diversifying the directions to which the liquid crystal molecules are included by arranging the cutouts and the protrusions in a certain way.

Typically, the side visibility of the VA mode LCD is inferior to front visibility thereof, and a method of dividing one pixel into two subpixels and applying different voltages to the two subpixels to obtain different transmittance may be used to improve the side visibility.

BRIEF SUMMARY OF THE INVENTION

Exemplary embodiments according to the present invention relates to a vertical alignment ("VA") mode liquid crystal display in which a side visibility is substantially improved.

In an exemplary embodiment, a liquid crystal display includes a signal line disposed on a substrate, a pixel electrode connected to the signal line and including a first subpixel electrode and a second subpixel electrode a common electrode disposed opposite the pixel electrode, and a liquid crystal layer disposed between the pixel electrode and the common electrode, where the liquid crystal layer is divided into domains including a first direction domain and a second direction domain in a region corresponding to the first subpixel electrode, and a third direction domain and a fourth direction domain in a region corresponding to the second subpixel electrode, and an area of the first direction domain is greater than about twice and less than about ten times an area of the second direction domain.

In an exemplary embodiment, the first direction domain may be one of an upper domain and a lower domain of the domains, and the second direction domain may be one of a left domain and a right domain of the domains.

In an exemplary embodiment, the area of the third direction domain may be greater than about half and less than about four times an area of the fourth direction domain.

In an exemplary embodiment, an area of the third direction domain may be greater than about half and less than about four times an area of the fourth direction domain.

In an exemplary embodiment, the third direction domain may be one of an upper domain and a lower domain, and the fourth direction domain may be one of a left domain and a right domain.

In an exemplary embodiment, the liquid crystal display may further include a step-down capacitor, and one terminal of the step-down capacitor may be connected to an output terminal of the switching element connected to the second subpixel electrode.

In an exemplary embodiment, the first subpixel electrode and the second subpixel electrode may be separated from each other, and the switching element and the step-down capacitor connected to the second subpixel electrode may be disposed between the first subpixel electrode and the second subpixel electrode.

In an exemplary embodiment, the liquid crystal display may further include a step-up capacitor, a first terminal of the step-up capacitor may be connected to an output terminal of the switching element connected to the second subpixel electrode, and a second terminal of the step-up capacitor may be connected to the first subpixel electrode.

In an exemplary embodiment, the first subpixel electrode and the second subpixel electrode may be separated from each other, and the switching element connected to the second subpixel electrode may be disposed between the first subpixel electrode and the second subpixel electrode.

In an exemplary embodiment, the common electrode may include a domain division member.

In an exemplary embodiment, the domain division member of the common electrode may include a first domain division member corresponding to the first subpixel electrode and a second domain division member corresponding to the second subpixel electrode, the first domain division member includes a first stem dividing the first subpixel electrode into an upper portion and a lower portion and a branch extending from the first stem, and the first branch forms an angle of about 45 degrees with the first stem.

In an exemplary embodiment, the second subpixel electrode may include a third domain division member. The second domain division member may include a first portion and a second portion corresponding to the lower portion and the upper portion of the second subpixel electrode, respectively. The first portion of the second domain division member may include a second stem dividing the second subpixel electrode into an upper portion and a lower portion, and the second portion of the second domain division member may include a third stem dividing the second subpixel electrode into a left portion and a right portion.

In another exemplary embodiment, a liquid crystal display includes a signal line disposed on a substrate, a pixel electrode connected to the signal line and including a first subpixel electrode and a second subpixel electrode, a common electrode disposed opposite the pixel electrode, and a liquid crystal layer disposed between the pixel electrode and the common electrode, where the liquid crystal layer is divided into domains including a first direction domain and a second direction domain in a region corresponding to the first subpixel electrode, and a third direction domain and a fourth direction domain in a region corresponding to the second subpixel electrode, and an area of the third direction domain is greater than about half and less than about four times an area of the fourth direction domain.

In an exemplary embodiment, the third direction domain may be one of an upper domain and a lower domain, and the fourth direction domain may be one of a left domain and a right domain.

In an exemplary embodiment, the first direction domain may be one of an upper domain and a lower domain, and the second direction domain may be one of a left domain and a right domain.

In an exemplary embodiment, the liquid crystal display may further include a storage electrode extending along an edge of the first subpixel electrode and an edge of the second subpixel electrode.

In an exemplary embodiment, a voltage charged between the first subpixel electrode and the common electrode may be greater than a voltage charged between the second subpixel electrode and the common electrode.

In an exemplary embodiment, the domain division member of the common electrode may include a first domain division member corresponding to the first subpixel electrode and a second domain division member corresponding to the second subpixel electrode, the first domain division member includes a first stem dividing the first subpixel electrode into an upper portion and a lower portion and a branch extending from the first stem, and the first branch forms an angle of about 45 degrees with the first stem.

In an exemplary embodiment, the second subpixel electrode may include a third domain division member, the second domain division member may include a first portion and a second portion corresponding to the lower portion and the upper portion of the second subpixel electrode, respectively, and the first portion of the second domain division member may include a second stem dividing the second subpixel electrode into an upper portion and a lower portion, and the second portion of the second domain division member includes a third stem dividing the second subpixel electrode into a left portion and a right portion.

BRIEF DESCRIPTION OF THE DRAWINGS

The above and other aspects and features of the present invention will become more apparent by describing in further detail exemplary embodiments thereof with reference to the accompanying drawings, in which.

DETAILED DESCRIPTION OF THE INVENTION

Figure 1A:
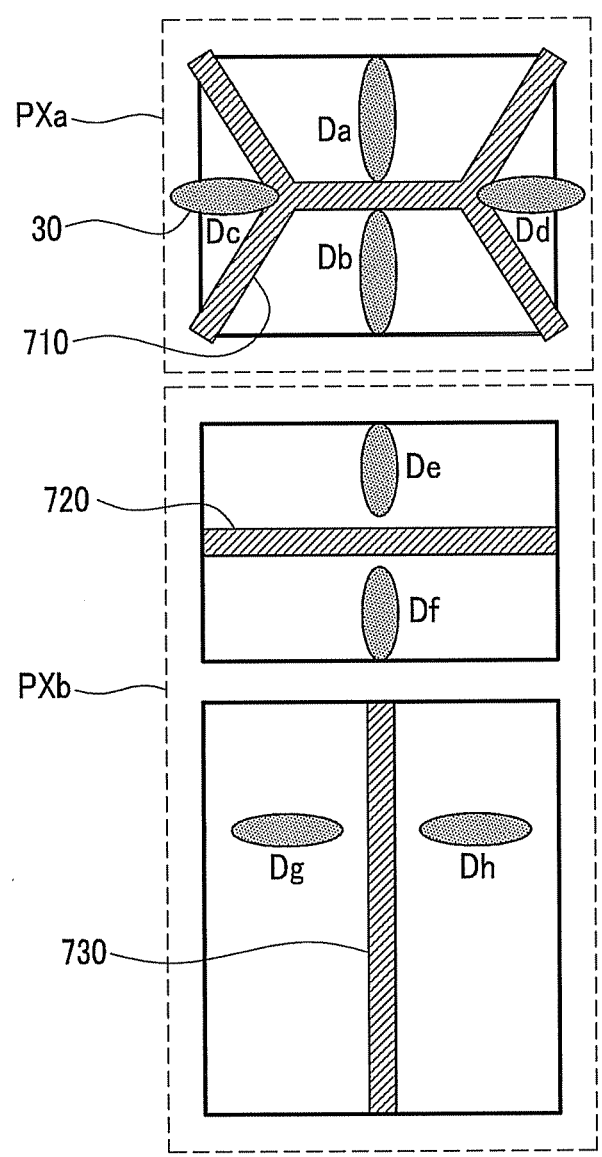
FIGS. 1A to 1D are plan views of exemplary embodiments of a pixel of a liquid crystal display according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A liquid crystal display according to an exemplary embodiment of the present invention now will be described in further detail with reference to FIG. 1.

FIGS. 1A to 1D are plan views of exemplary embodiments of a pixel of a liquid crystal display according to the present invention.

Referring to FIG. 1A, a pixel of a liquid crystal display includes a first subpixel PXa and a second subpixel PXb. In an exemplary embodiment, the magnitude of the voltage charged to the first subpixel PXa may be greater than the magnitude of the voltage charged to the second subpixel PXb.

The first subpixel PXa includes a first domain division member 710, and the second subpixel PXb includes a second domain division member 720 and a third domain division member 730.

As shown in FIG. 1A, the first domain division member 710 includes a transverse stem that divides the first subpixel PXa into a first domain Da and a second domain Db and branches extending from the transverse stem. In an exemplary embodiment, the branch may extend from the transverse stem at an angle of about 45 angular degrees (°) with respect to the transverse stem, but not being limited thereto. The first subpixel PXa is divided into a third domain Dc and a fourth domain Dd by the branches of the first domain division member 710.

The second domain division member 720 and the third domain division member 730 of the second subpixel PXb are disposed on, e.g., above or below, the second subpixel PXb. The second domain division member 720 includes a transverse stem dividing a portion of the second subpixel PXb into a fifth domain De and a sixth domain Df, and the third domain division member 730 includes a longitudinal stem dividing a portion of the second subpixel PXb into a seventh domain Dg and an eighth domain Dh.

In an exemplary embodiment, an electric field may be applied to the liquid crystal molecules vertically aligned when electric fields are not generated in the liquid crystal layer, and the liquid crystal molecules may be inclined in a plurality of directions by the first domain division member 710, the second domain division member 720 and the third domain division member 730 when the electric fields are generated therein. In an exemplary embodiment, the first subpixel PXa and the second subpixel PXb may be divided into a plurality of domains based on the inclination direction of the liquid crystal molecules. As shown in FIG. 1A, a liquid crystal direction indicator 30 conceptually shows an inclination direction of the liquid crystal molecules by the electric field generated in the liquid crystal layer.

In an exemplary embodiment, when the first subpixel PXa is divided into the first domain Da, the second domain Db, the third domain Dc and the fourth domain Dd by the first domain division member 710, the total area (D1) of the first domain Da and the second domain Db may be greater than about twice and less than about ten times the total area (D2) of the third domain Dc and the fourth domain Dd. Thus, 2<D1/D2<10.

In an exemplary embodiment, the first domain Da and the second domain Db may be upper and lower domains, and the third domain Dc and the fourth domain Dd may be left and right domains.

In an exemplary embodiment, when the second subpixel PXb is divided into the fifth domain De and the sixth domain Df by the second domain division member 720, and into the seventh domain Dg and the eighth domain Dh by the third domain division member 730, the total area (D3) of the fifth domain De and the sixth domain Df may be greater than about half and less than about four times the total area (D4) of the seventh domain Dg and the eighth domain Dh. Thus, 0.5<D3/D4<4.

In an exemplary embodiment, the fifth domain De and the sixth domain Df may be upper and lower domains, and the seventh domain Dg and the eighth domain Dh may be left and right domains.

Figure 1B:
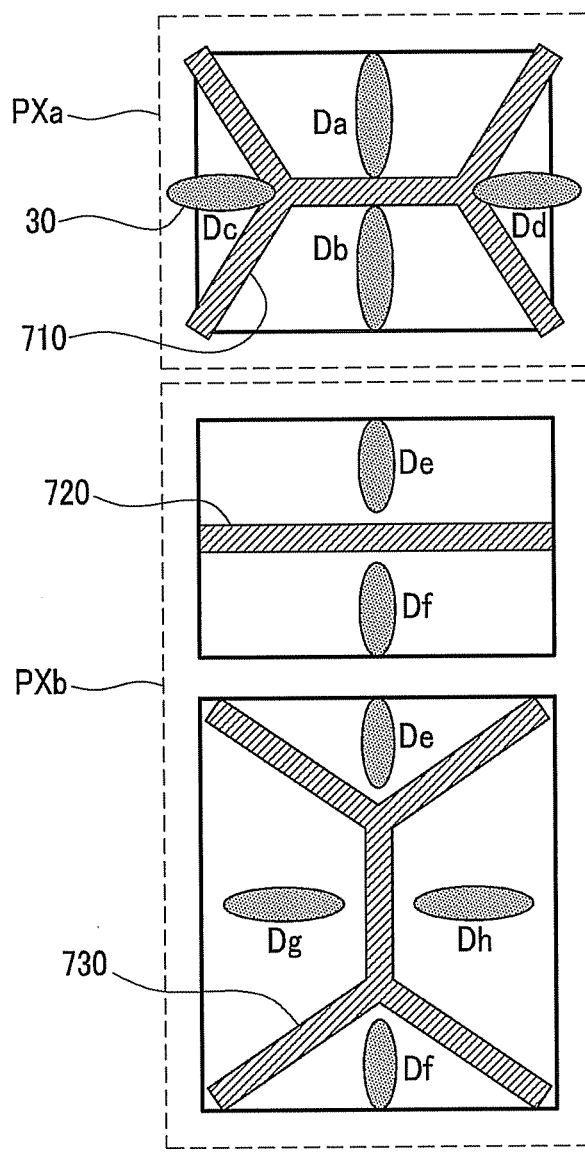

Referring to FIG. 1B, another exemplary embodiment of the pixel of a liquid crystal display in FIG. 1B is substantially the same as the pixel of the liquid crystal display of FIG. 1A except for the third domain division member 730.

As shown in FIG. 1B, the pixel of the liquid crystal display includes the first subpixel PXa and the second subpixel PXb, and the magnitude of the voltage charged to the first subpixel PXa may be greater than the magnitude of the voltage charged to the second subpixel PXb.

The first subpixel PXa is divided into the first domain Da, the second domain Db, the third domain Dc, and the fourth domain Dd by the first domain division member 710, and the total area (D1) of the first domain Da and the second domain Db may be greater than about twice and less than about ten times the total area (D2) of the third domain Dc and the fourth domain Dd. Thus, 2<D1/D2<10. In an exemplary embodiment, the first domain Da and the second domain Db may be upper and lower domains, and the third domain Dc and the fourth domain Dd may be left and right domains.

As shown in FIG. 1B, the second subpixel PXb of the pixel of the liquid crystal display may be divided into the fifth domain De and the sixth domain Df by the second domain division member 720, and into the fifth domain De, the sixth domain Df, the seventh domain Dg and the eighth domain Dh by the third domain division member 730. In an exemplary embodiment, the total area (D3) of the fifth domain De and the sixth domain Df may be greater than about half and less than about four times the total area (D4) of the seventh domain Dg and the eighth domain Dh. Thus, in an exemplary embodiment, $0.5<D3/D4<4$. In an exemplary, the fifth domain De and the sixth domain Df may be upper and lower domains, and the seventh domain Dg and the eighth domain Dh may be left and right domains.

Figure 1C:
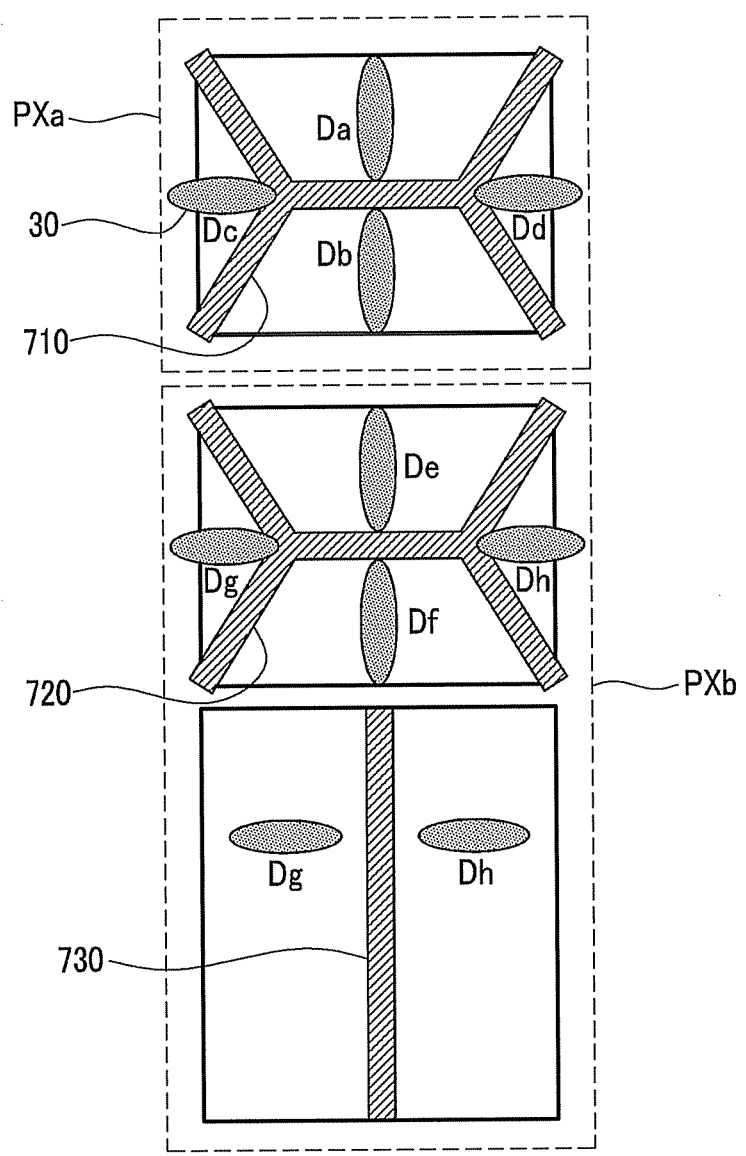

Referring to FIG. 1C, another exemplary embodiment of the pixel of a liquid crystal display in FIG. 1C is substantially the same as the pixel of the liquid crystal display in FIG. 1A except for the second domain division member 720.

As shown in FIG. 1C, the pixel of the liquid crystal display includes the first subpixel PXa and the second subpixel PXb, and the magnitude of the voltage charged to the first subpixel PXa may be larger than the magnitude of the voltage charged to the second subpixel PXb.

The first subpixel PXa is divided into the first domain Da, the second domain Db, the third domain Dc, and the fourth domain Dd by the first domain division member 710, and the total area (D1) of the first domain Da and the second domain Db may be greater than about twice and less than about ten times the total area (D2) of the third domain Dc and the fourth domain Dd. Thus, in an exemplary embodiment, $2<D1/D2<10$. In an exemplary embodiment, the first domain Da and the second domain Db may be upper and lower domains, and the third domain Dc and the fourth domain Dd may be left and right domains.

As shown in the FIG. 1C, the second subpixel PXb of the pixel of the liquid crystal display may be divided into the fifth domain De, the sixth domain Df, the seventh domain Dg and the eighth domain Dh by the second domain division member 720, and into the fifth domain De and the sixth domain Df by the third domain division member 730. As describe above, the total area (D3) of the region occupied by the fifth domain De and the sixth domain Df may be greater than about half and less than about four times the total area (D4) of the seventh domain Dg and the eighth domain Dh. Thus, in an exemplary embodiment, $0.5<D3/D4<4$. In an exemplary embodiment, the fifth domain De and the sixth domain Df may be upper and lower domains, and the seventh domain Dg and the eighth domain Dh may be left and right domains.

Figure 1D:
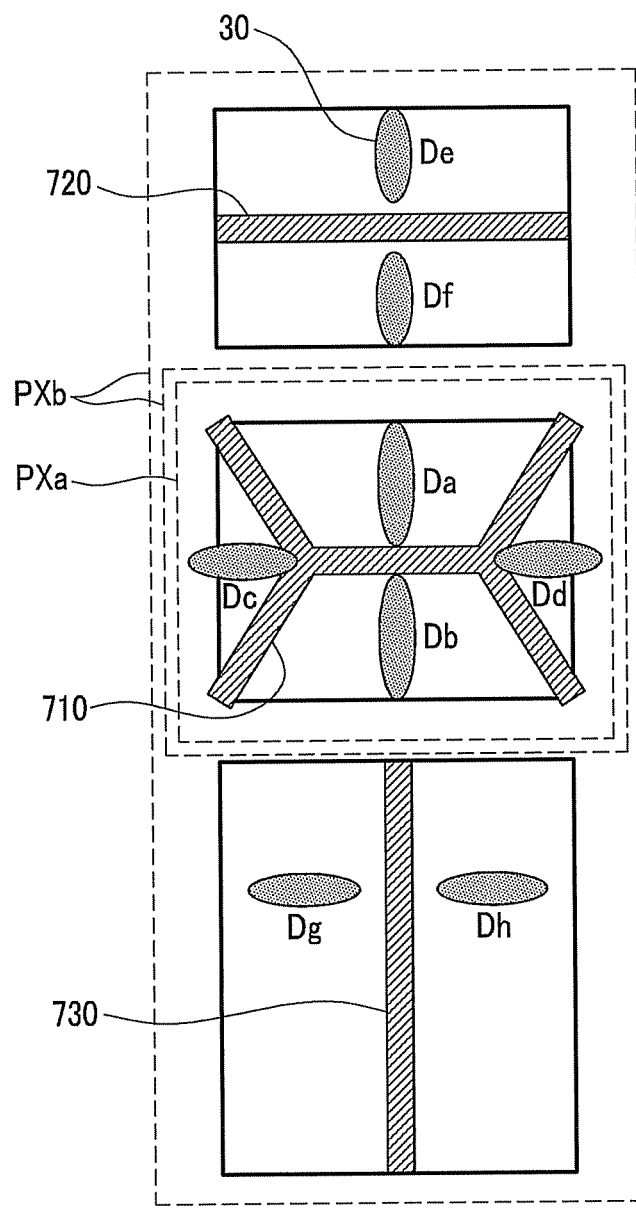

Referring to FIG. 1D, another exemplary embodiment of the pixel of a liquid crystal display in FIG. 1D is substantially the same as the pixel of the liquid crystal display according to the exemplary embodiment shown in FIG. 1A except for the first subpixel PXa.

The pixel of the liquid crystal includes the first subpixel PXa and the second subpixel PXb, and the magnitude of the voltage charged to the first subpixel PXa may be larger than the magnitude of the voltage charged to the second subpixel PXb.

A shown in FIG. 1D, the first subpixel PXa of the pixel of the liquid crystal display may be disposed between the second subpixels PXb.

The first subpixel PXa is divided into the first domain Da, the second domain Db, the third domain Dc, and the fourth domain Dd by the first domain division member 710, and the total area (D1) of the first domain Da and the second domain Db may be greater than about twice and less than about ten times the total area (D2) of the third domain Dc and the fourth domain Dd. Thus, in an exemplary embodiment, $2<D1/D2<10$. In an exemplary embodiment, the first domain Da and the second domain Db may be upper and lower domains, and the third domain Dc and the fourth domain Dd may be left and right domains.

The second subpixel PXb is divided into the fifth domain De and the sixth domain Df by the second domain division member 720, and into the seventh domain Dg and the eighth domain Dh by the third domain division member 730. In an exemplary embodiment, the total area (D3) of the fifth domain De and the sixth domain Df may be greater than about half and less than about four times the total area (D4) of the seventh domain Dg and the eighth domain Dh. Thus, in an exemplary embodiment, $0.5<D3/D4<4$. In an exemplary embodiment, the fifth domain De and the sixth domain Df may be upper and lower domains, and the seventh domain Dg and the eighth domain Dh may be left and right domains.

Figure 2:
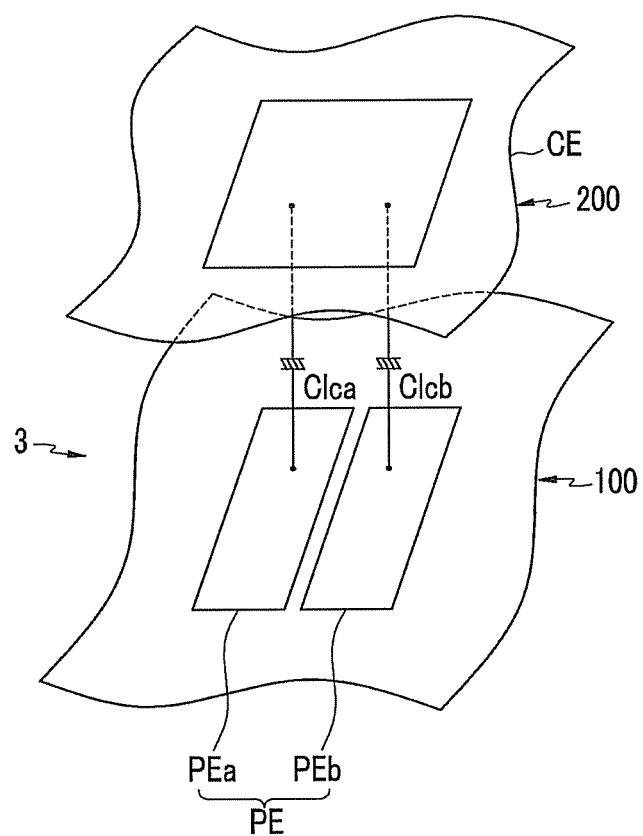
FIG. 2 is a plan view of a liquid crystal display including an exemplary embodiment of two subpixels according to the present invention.
Figure 3:
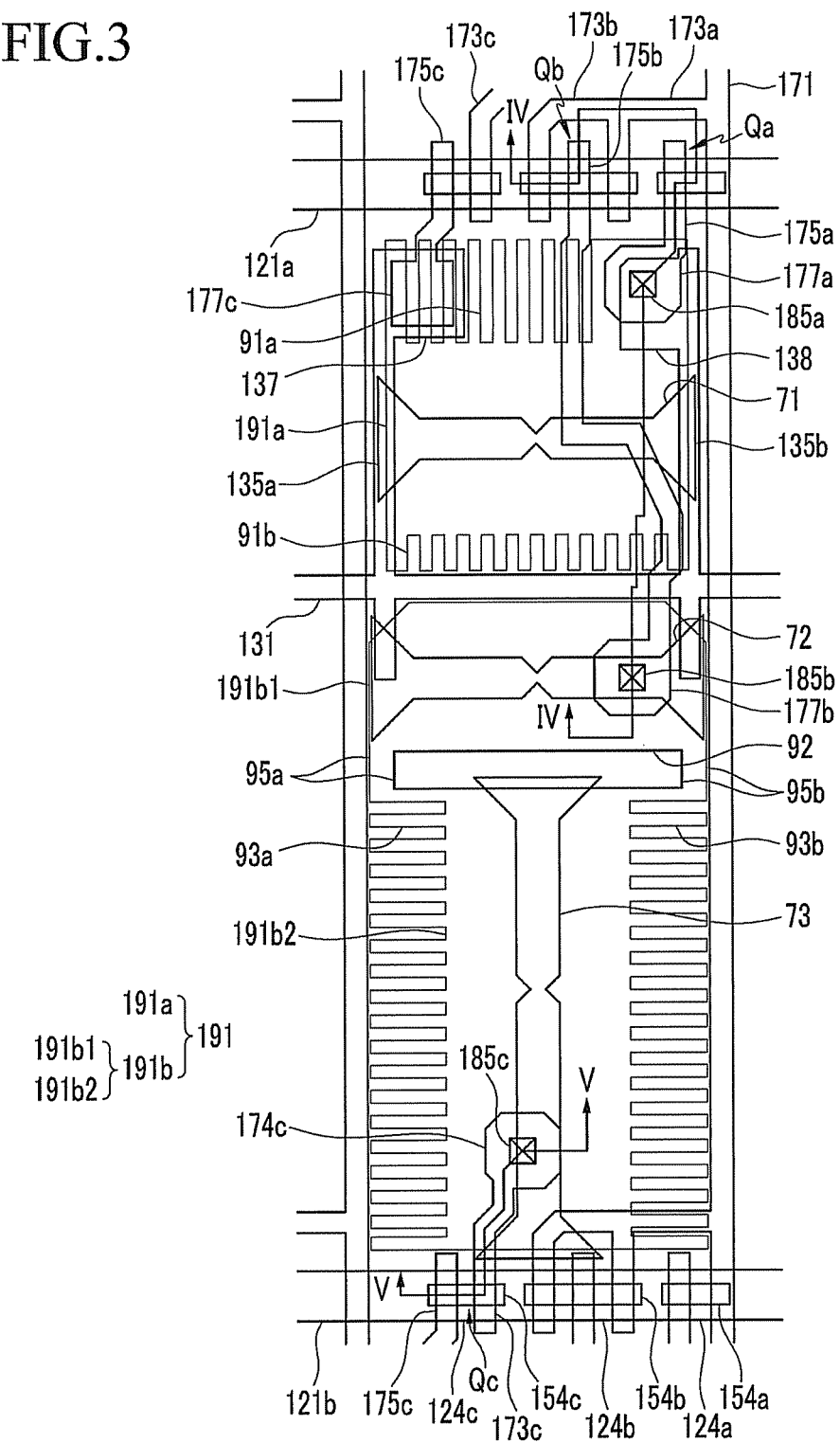
FIG. 3 is a plan view of an exemplary embodiment of a liquid crystal display according to the present invention.
Figure 4:
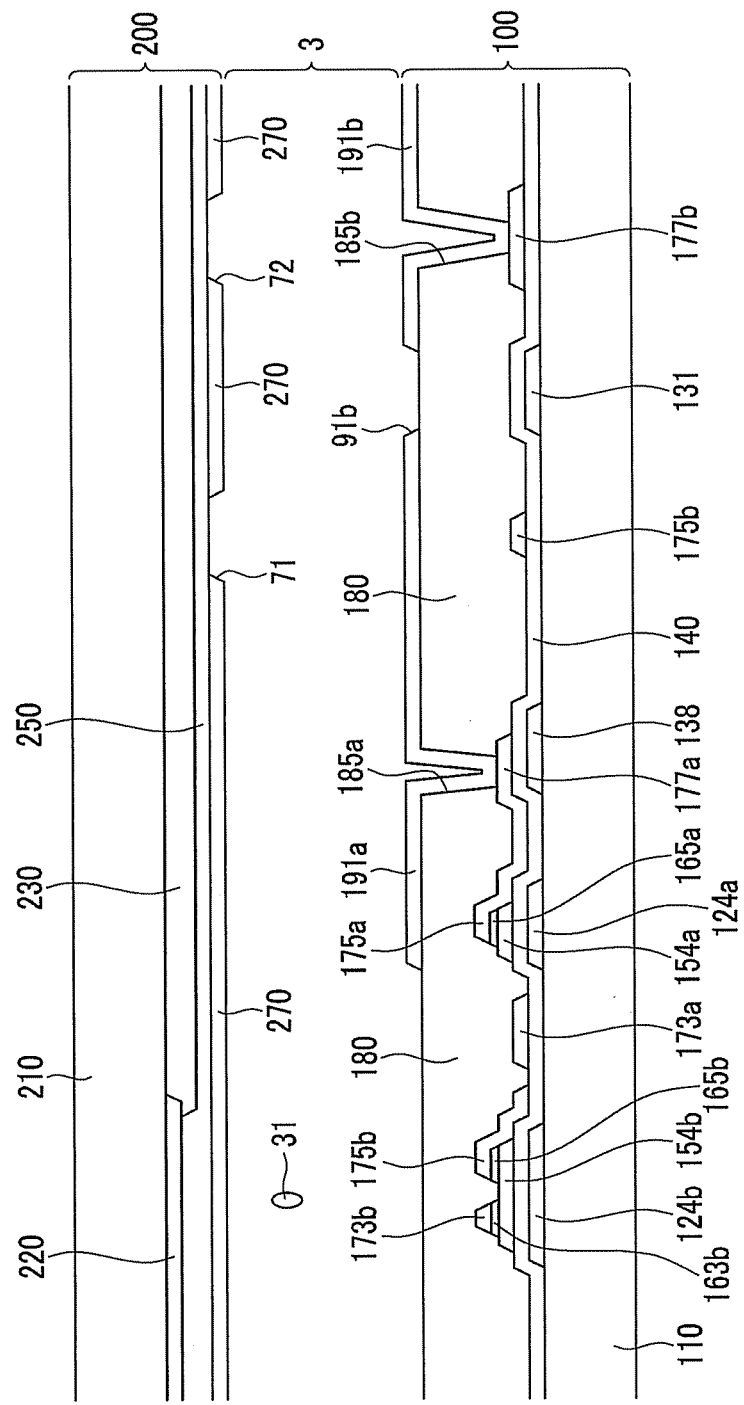
FIGS. 4 and 5 are partial cross-sectional views taken along line IV-IV and line V-V, respectively, of FIG. 3.
Figure 5:
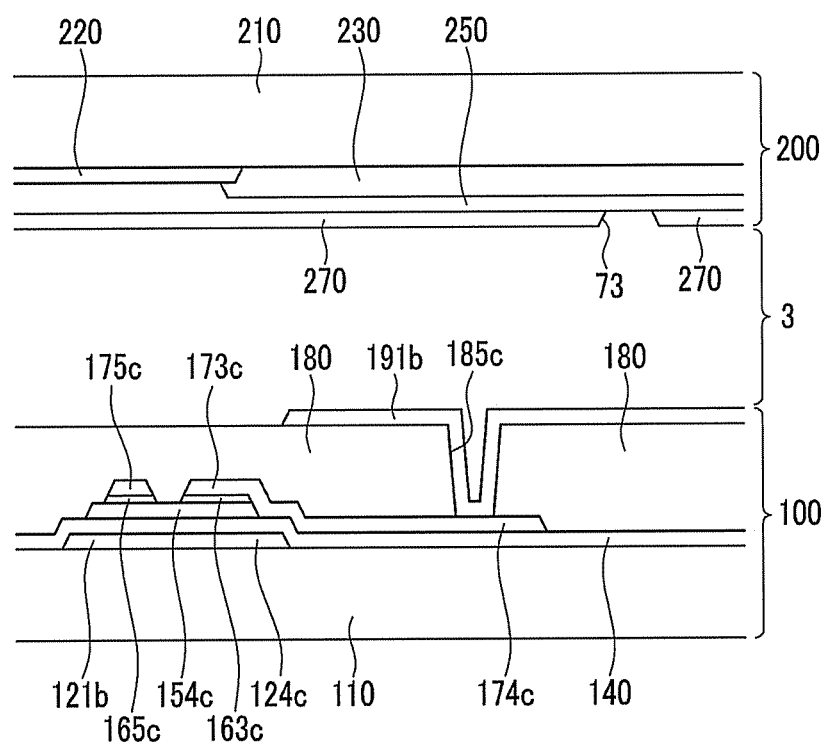
Figure 6:
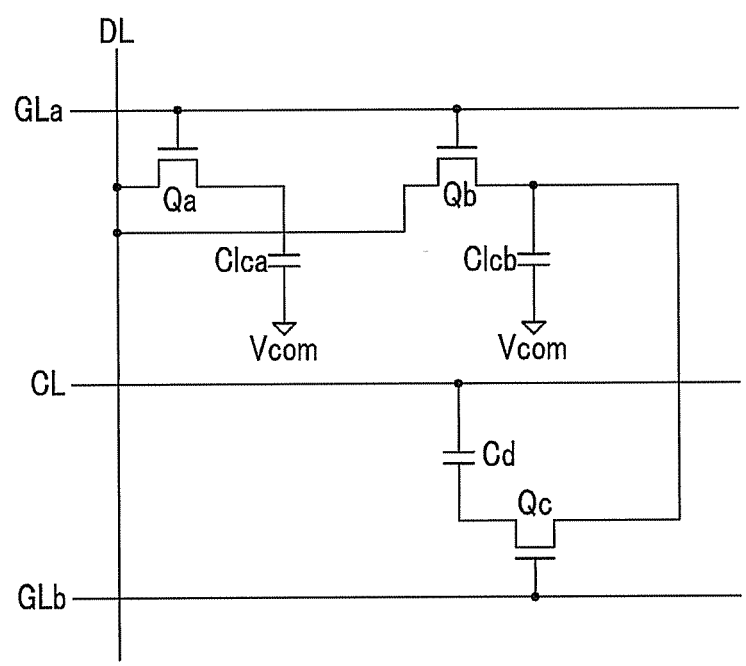
FIG. 6 is a schematic circuit diagram of an exemplary embodiment of a pixel of a liquid crystal display according to the present invention.

An exemplary embodiment of a liquid crystal display now will be described in further detail with reference to FIGS. 2 to 6. FIG. 2 is a plan view of an exemplary embodiment of the liquid crystal display including two subpixels, FIG. 3 is a plan view of an exemplary embodiment of the liquid crystal display, FIGS. 4 and 5 are partial cross-sectional views taken along line IV-IV and line V-V, respectively, of FIG. 3, and FIG. 6 is a schematic circuit diagram of an exemplary embodiment of a pixel of a liquid crystal.

As shown in FIG. 2, the liquid crystal display includes a lower panel 100 and an upper panel 200 disposed opposite to, e.g., facing, each other, and a liquid crystal layer 3 interposed between a lower panel 100 and an upper panel 200. The liquid crystal display includes signal lines and pixels PX connected to the signal lines.

Each of the pixels PX may include two subpixels, and each of the two subpixels includes liquid crystal capacitors, e.g., a first liquid crystal capacitor Clca and a second liquid crystal capacitor Clcb. The two subpixels may include gate lines, e.g., a first and second gate lines GLa and GLb, a data line DL and switching elements, e.g., a first, second and third switching elements Qa, Qb and Qc, connected to the liquid crystal capacitors, e.g., the first and second liquid crystal capacitors Clca and Clcb.

The liquid crystal capacitors, e.g., the first and second liquid crystal capacitors Clca and Clcb, may have two terminals of subpixel electrodes, e.g., a first and second subpixel electrodes PEa and PEb, of the lower panel 100 and a common electrode CE of the upper panel 200, and the liquid crystal layer 3 which provides a dielectric material between the subpixel electrodes, e.g., the first and second subpixel electrodes PEa and PEb, and the common electrode 270. The subpixel electrodes, e.g., the first and second subpixel electrodes PEa and PEb, of a pair are separated from each other and form a pixel electrode PE. The common electrode CE is disposed on the upper panel 200, e.g., the whole area of the upper panel 200, and receives a common voltage Vcom. The liquid crystal layer 3 has negative dielectric anisotropy, and the longitudinal axes of liquid crystal molecules 31 of the liquid crystal layer 3 may be aligned substantially perpendicular to the surfaces of the two display panels when an electric field is not generated in the liquid crystal layer 3. In another exemplary embodiment, the common electrode CE may be disposed on the lower panel 100, and at least one of the pixel electrode PE and the common electrode CE may be a line type or a bar type electrode.

In an exemplary embodiment, to display a color image, a pixel PX may displays one of primary colors (spatial division), or a pixel PX temporally and alternately displays primary colors (temporal division). Then, the primary colors are spatially or temporally synthesized, and the pixel PX thus displays a predetermined color. The primary colors may include three primary colors of red, green and blue, for example. In an exemplary embodiment the liquid crystal display may use a spatial division method where the pixel PX includes a color filter disposed on, e.g., above or below, the subpixel electrodes, e.g., the first and second subpixel electrodes PEa and PEb, and thereby displays one of the primary colors. In another exemplary embodiment, the color filter may be disposed in the upper panel 200, e.g., in a corresponding region of the upper panel 200.

Polarizers (not shown) that provide light polarization may be disposed on outer surfaces of the display panels 100 and 200, and the polarization axes of two polarizers of the polarizers may be substantially perpendicular to each other. One of the two polarizers may be omitted in a reflective LCD. When the polarization axes of the two polarizers are substantially perpendicular to each other, the light incident to the liquid crystal layer 3 is blocked when an electric field is not generated in the liquid crystal layer 3.

The liquid crystal display now will be described in greater detail with reference to FIGS. 3 to 5.

An exemplary embodiment of the liquid crystal display includes a lower panel 100 and an upper panel 200 disposed opposite to, e.g., facing, each other, a liquid crystal layer 3 interposed between the lower and upper display panels 100 and 200, and polarizers (not shown) disposed on, e.g., attached to, outer surfaces of the upper and lower display panels 100 and 200.

The lower panel 100 now will be described in further detail.

A plurality of gate conductors including a first gate line 121a and a second gate line 121b and a capacitor voltage line 131 is disposed on an insulation substrate 110 made of transparent glass or plastic, for example. The first gate line 121a and the second gate line 121b include a first gate electrode 124a, a second gate electrode 124b a third gate electrode 124c and a wide end portion (not shown) which may be connected to other layers or an external driving circuit, for example.

The capacitor voltage line 131 transmits a predetermined capacitor voltage, and includes a plurality of storage electrodes 135a, 135b and 138, and a capacitor electrode 137 including a wide portion.

A gate insulating layer 140 is formed on the gate conductors, e.g., the first gate line 121a, the second gate line 121b and the capacitor voltage line 131. A first semiconductor island 154a, a second semiconductor island 154b and a third semiconductor island 154c are formed on the gate insulating layer 140.

Ohmic contacts 165a, 163b, 165b, 163c and 165c are formed on the first semiconductor island 154a, the second semiconductor island 154b and the third semiconductor island 154c.

A data conductor including a plurality of data lines 171 having first source electrodes 173a, second source electrodes 173b, first drain electrodes 175a, second drain electrodes 175b, third source electrodes 173c and third drain electrodes 175c is formed on the ohmic contacts 165a, 163b, 165b, 163c, 165c and the gate insulating layer 140.

The data line 171 includes a wide end portion (not shown) which may be connected to other layers or an external driving circuit, for example.

The first to third drain electrodes 175a, 175b and 175c have wide end portions at one end thereof, respectively, and bar-shaped end portions at the other end thereof, respectively. The third source electrode 173c has a wide end portion 174c.

The first gate electrode 124a, the first source electrode 173a and the first drain electrode 175a form the first thin film transistor Qa along with the first semiconductor island 154a, and a channel of the thin film transistor may be formed in the first semiconductor island 154a disposed between the first source electrode 173a and the first drain electrode 175a. In an exemplary embodiment, the second gate electrode 124b, the second source electrode 173b and the second drain electrode 175b form the second thin film transistor Qb along with the second semiconductor island 154b, and a channel of the second thin film transistor Qb may be formed in the second semiconductor island 154b disposed between the second source electrode 173b and the second drain electrode 175b. The third gate electrode 124c, the third source electrode 173c, and the third drain electrode 175c form the third thin film transistor Qc along with the third semiconductor island 154c, and a channel of the third thin film transistor Qc is formed in the third semiconductor island 154c disposed between the third source electrode 173c and the third drain electrode 175c.

A passivation layer 180 is formed on the data conductors, e.g., the data lines 171 including the first source electrodes 173a, the second source electrodes 173b, the first drain electrodes 175a, the second drain electrodes 175b, the third source electrodes 173c and the third drain electrodes 175c, and the exposed semiconductors, e.g., the first to third semiconductors islands 154a, 154b and 154c. The passivation layer 180 may be made of an inorganic insulator such as silicon nitride and silicon oxide, for example. In another exemplary embodiment, the passivation layer 180 may be made of an organic insulator, for example, and may have a planarized surface. The organic insulator may have photosensitivity and a dielectric constant not greater than about 4.0. In another exemplary embodiment, the passivation layer 180 may have a dual-layered structure including a lower inorganic layer and an upper organic layer, and thereby effectively prevent harm to the exposed portions of the semiconductors, e.g., the first to third semiconductor islands 154a, 154b and 154c and substantially effectively insulate the organic layer.

The passivation layer 180 may include a plurality of contact holes 185a, 185b and 185c which expose the wide end portions 177a, 177b and 177c of the first to third drain electrodes 175a, 175b and 175c.

A pixel electrode 191 including a first subpixel electrode 191a and a second subpixel electrode 191b may be disposed on the passivation layer 180. The pixel electrode 191 may be made of a transparent material such as indium tin oxide ("ITO") and indium zinc oxide ("IZO"), for example. The pixel electrode 191 may be made of a transparent conductive material such as ITO or IZO, for example, or a reflective metal such as aluminum, silver, chromium or an alloy/alloys thereof, but not being limited thereto.

The first subpixel electrode 191a and the second subpixel electrode 191b are disposed adjacent to each other in a column direction, and have quadrangle-like shapes.

The first subpixel electrode 191a and the second subpixel electrode 191b are disposed with a predetermined distance, and the capacitor voltage line 131 is disposed in a gap between the first subpixel electrode 191a and the second subpixel electrode 191b.

Minute branches 91a and 91b are disposed in a first edge and a second edge of the first subpixel electrode 191a. In an exemplary embodiment, the first edge of the first subpixel electrode 191a may be an upper edge, and the second edge of the first subpixel electrode 191a may be a lower edge.

The second subpixel electrode 191b may be divided into a first portion 191b1 disposed in an upper portion of the second subpixel electrode 191b with respect to a cutout 92 and a second portion 191b2 disposed in a lower portion of the second subpixel electrode 191b with respect to the cutout 92. The first portion 191b1 and the second portion 191b2 are connected by connections 95a and 95b disposed on each sides of the second subpixel electrode 191b. Minute branches 93a and 93b are disposed in a first edge and a second edge of the second portion 191b2 of the second subpixel electrode 191b.

In an exemplary embodiment, the first edge of the second subpixel electrode 191b may be a left edge, and the second edge of the second subpixel electrode 191b may be a right edge.

The first subpixel electrode 191a and the second subpixel electrode 191b are connected to the first drain electrode 175a and the second drain electrode 175b through the contact holes 185a and 185b, and thereby receive the data voltage from the first drain electrode 175a and the second drain electrode 175b. The first/second subpixel electrodes 191a/191b applied with the data voltages generate an electric field along with the common electrode 270 of the common electrode panel 200 such that the orientation of the liquid crystal molecules of the liquid crystal layer 3 between the electrodes 191a/191b and 270 is determined. The polarization of light passing through the liquid crystal layer 3 may vary according to the alignment directions of the liquid crystal molecules 31 determined based on the electric filed generated therein. The first and second pixel electrodes 191a and 191b and the common electrode 270 form a liquid crystal capacitor, and thereby store voltages applied thereto when the thin film transistor turns off.

In an exemplary embodiment, the first and second subpixel electrodes 191a and 191b overlap the capacitor voltage line 131 and the storage electrodes 135a, 135b and 138 to form a storage capacitor, which reinforces the voltage storage capacity of the liquid crystal capacitors Clca and Clcb.

The first subpixel electrode 191a is connected to the wide end portion 174c of the third source electrode 173c through the contact hole 185c.

The wide end portion 177c of the third drain electrode 175c overlaps the capacitor electrode 137 via the gate insulating layer 140 interposed therebetween, and thereby forms a stepdown capacitor Cd.

Hereinafter, the upper panel 200 will be described in greater detail.

A light blocking member 220 is disposed on an insulation substrate 210 made of transparent glass or plastic, for example. The light blocking member 220 is referred to a black matrix, and prevents light leakage.

A plurality of color filters 230 are disposed on the insulation substrate 210 and the light blocking member 220. The color filters 230 are disposed substantially within the area surrounded by the light blocking member 220, and may extend along the columns of the pixel electrodes 191 in the longitudinal direction. Each of the color filters 230 may have one of three primary colors, for example, one of red, green and blue.

At least one of the light blocking member 220 and the color filter 230 may be disposed on the insulation substrate 110.

An overcoat 250 is disposed on the color filters 230 and the light blocking member 220. The overcoat 250 effectively prevents exposure of the color filters 230, and provides a flat surface. In another exemplary embodiment, the overcoat 250 may be omitted.

A common electrode 270 is disposed on the overcoat 250. The common electrode 270 is made of a transparent conductive material such as ITO and IZO, for example, and including a plurality of domain division members, e.g., a first domain division member 71, a second domain division member 72 and a third domain division member 73.

The domain division members are disposed opposite to, e.g., facing, one pixel electrode 191, and include the first domain division member 71, the second domain division member 72 and the third domain division member 73. The first domain division member 71 bisects the region of the first subpixel electrode 191a perpendicularly, the second domain division member 72 bisects the first portion 191b1 of the second subpixel electrode 191b perpendicularly and the third domain division member 73 bisects the second portion 191b2 of the second subpixel electrode 191b horizontally. End portions of each of the first domain division member 71, the second domain division member 72 and the third domain division member 73 has an isosceles trapezoid-like shape. Triangle-shaped notches are formed at central portions of the each of the first domain division member 71, the second domain division member 72 and the third domain division member 73. A shape of the notches may be a quadrangular trapezoidal, or semicircular, for example, and may be convex or concave. The notches determine the alignment directions of the liquid crystal molecules 31 disposed adjacent to the first domain division member 71, the second domain division member 72 and the third domain division member 73. In an exemplary embodiment, the first domain division member 71, the second domain division member 72 and the third domain division member 73 may include cutouts or protrusions, for example.

The number and direction of the domain division member may vary according to the elements of design, and the shape and the arrangement of the domain division members may vary.

In another exemplary embodiment, alignment layers (not shown) may be disposed on surfaces of the upper and lower panels 100 and 200, and may be vertical alignment layers.

In another exemplary embodiment, polarizers (not shown) may be disposed on the outer surfaces of the upper and lower panels 100 and 200, the polarization axes of two polarizers may be substantially perpendicular to each other, and one polarization axis of the polarizers may be substantially parallel to the gate lines 121. In another exemplary embodiment, one of the two polarizers may be omitted.

The liquid crystal layer 3 has negative dielectric anisotropy, and the longitudinal axes of the liquid crystal molecules 31 of the liquid crystal layer 3 are aligned substantially perpendicular to the surfaces of the upper and lower panels 100 and 200 when electric field are not generated in the liquid crystal layer 3.

In an exemplary embodiment, the gap between the first and second subpixel electrodes 191a and 191b of the pixel electrode 191, the cutout 92 of the second subpixel electrode 191b and the first, second and third domain division members 71, 72 and 73 of the common electrode 270 distort the electric field, and thereby generate horizontal components of the electric fields that determine the inclination directions of the liquid crystal molecules 31. The horizontal components of the electric field are perpendicular to the gap of the pixel electrode 191, the cutout 92 and the first, second and third domain division members 71, 72 and 73 of the common electrode 270.

In an exemplary embodiment, inclination directions of the liquid crystal molecules 31 may be classified into about four directions, and the liquid crystal layer 3 may be divided into four domains including the alignment directions of the liquid crystal molecules 31 different from each other. More particularly, the liquid crystal layer 3 corresponding to the first subpixel electrode 191a may be divided into four domains of a first domain, a second domain, a third domain and a fourth, and the liquid crystal layer 3 corresponding to the second subpixel electrode 191b may be divided into a fifth domain, a sixth domain, a seventh domain and an eighth domain. The minute branches 91a, 91b, 93a and 93b formed at the both edges of the first subpixel electrode 191a and the second subpixel electrode 191b distort the electric field and thereby assist the determination of the inclination direction of the liquid crystal molecules disposed on the boundaries of the first and second subpixel electrodes 191a and 191b. The minute branches 91a, 91b, 93a and 93b extend substantially parallel to a direction that the liquid crystal molecules 31 of the first and second subpixel electrodes 191a and 191b are inclined to.

The viewing angle of the liquid crystal display is substantially widened by varying the inclined directions of the liquid crystal molecules.

In an exemplary embodiment, the total area (D1) of the first domain and the second domain of the liquid crystal layer 3 corresponding to the first subpixel electrode 191a is greater than about twice and less than about ten times the total area (D2) of the third domain and the fourth domain of the liquid crystal layer 3 corresponding to the first subpixel electrode 191a. Thus, in an exemplary embodiment, 2<D1/D2<10. In an exemplary embodiment, the first domain and the second domain may be upper and lower domains, and the third domain and the fourth domain may be left and right domains.

In an exemplary embodiment, the total area (D3) the fifth domain and the sixth domain of the liquid crystal layer 3 corresponding to the second subpixel electrode 191b may be greater than about half and less than about four times the total area (D4) of the seventh domain and the eighth domain of the liquid crystal layer 3 corresponding to the second subpixel electrode 191b. Thus, in an exemplary embodiment, 0.5<D3/D4<4. In an exemplary embodiment, the fifth domain and the sixth domain may be upper and lower domains, and the seventh domain and the eighth domain may be left and right domains.

Hereinafter, operation of the liquid crystal display will be described in further detail with reference to FIG. 6.

As shown in FIG. 6, the liquid crystal display includes a plurality of signal lines including a plurality of gate lines, e.g., a first gate line GLa and a second gate line GLb, that transmit a gate signal (also referred to as "scanning signal"), a data line DL that transmits a data voltage, and a capacitor electrode line CL that transmits a common voltage Vcom, and a pixel PX connected to the signal lines. a plurality of gate lines, e.g., the first gate line GLa and the second gate line GLb, and the capacitor electrode line CL may extend substantially in a row direction and parallel to each other, and the data line DL may extend substantially in a column direction and parallel to another data line.

The pixel may include switching elements, e.g., a first switching element Qa, a second switching element second Qb and a third switching element Qc, liquid crystal capacitors, e.g., the first liquid crystal capacitor Clca, the second liquid crystal capacitor Clcb and a step-down capacitor Cd.

The first and second switching elements Qa and Qb are connected to the first gate line GLa and the data line DL, respectively, and the third switching element Qc is connected to the second gate line GLb.

The first and second switching elements Qa and Qb may be three terminal elements such as thin film transistors disposed in the lower panel 100, for example, and the first and second switching elements Qa and Qb have control terminals connected to the first gates line GLa and input terminals connected to the data line DL. An output terminal of the first switching element Qa is connected to the first liquid crystal capacitor Clca, and an output terminal of the second switching element Qb is connected to the second liquid crystal capacitor Clcb.

The third switching element Qc may be a three terminal element such as a thin film transistor disposed in the lower panel 100, for example, and has a control terminal connected to the second gate lines GLb, an input terminal connected to the second liquid crystal capacitor Clcb and an output terminal connected to the step-down capacitor Cd.

The step-down capacitor Cd is connected to the output terminal of the third switching element Qc and the capacitor electrode line CL, and is formed by overlapping the output electrode of the third switching element Qc and the capacitor electrode line CL disposed in the lower panel 100 via an insulator disposed therebetween.

A first gate signal is applied to the first gate line GLa, and a second gate signal is applied to the second gate line GLb. When the first gate signal shifts from the gate-off voltage to the gate-on voltage, the first and second switching elements Qa and Qb connected to the first gate line GLa are turned on. Accordingly, the data voltage applied to the data line DL is transmitted to the first and second subpixel electrodes PEa and PEb through the turned-on first and second switching elements Qa and Qb. In an exemplary embodiment, the data voltages applied to the first and second subpixel electrodes PEa and PEb may be identical to each other. The first and second liquid crystal capacitors Clca and Clcb may be charged with a same amount of electric charge according to a difference between the common voltage and the data voltage.

When the first gate signal shifts from the gate-on voltage to the gate-off voltage, and the second gate signal shifts from the gate-off voltage to the gate-on voltage, the first and second switching elements Qa and Qb are turned off, while the third switching element Qc is turned on. Accordingly, the charges are moved from the second subpixel electrode PEb to the third drain electrode 175c through the third switching element Qc, and the charging voltage of the second liquid crystal capacitor Clcb is thereby decreased, and the step-down capacitor Cd is charged. The charged voltage of the second liquid crystal capacitor Clcb is decreased by the capacitance of the step-down capacitor Cd, and the charged voltage of the second liquid crystal capacitor Clcb is thereby less than the charged voltage of the first liquid crystal capacitor Clca.

The voltages charged at the first and second liquid crystal capacitors Clca and Clcb indicate different gamma curves, which are combined to be a complex gamma curve of a pixel voltage. In an exemplary embodiment, the frontal complex gamma curve may be substantially identical to the reference gamma curve at the optimally-determined front side, and the lateral gamma curve may be similar to the frontal reference gamma curve. Accordingly, the lateral visibility is substantially improved by converting image data.

In a high subpixel charged with a relatively high voltage, the side visibility is low at a low gray level where the liquid crystal is aligned vertically, and the visibility characteristics are thereby determined by the high subpixel at a low gray level, and in a low subpixel charged with a low voltage, the side visibility is low at a middle gray level and a high gray level where the liquid crystal is aligned closer to the horizontal alignment, and the visibility characteristics are thereby determined by the low subpixel at the middle gray level and the high gray level.

As described above, the total area (D1) of the first domain and the second domain, which are the upper and lower domains of the domains corresponding to the first subpixel electrode 191a charged with the relatively high voltage as a high subpixel, may be greater than about twice and less than about ten times the total area (D2) of the third domain and the fourth domain, which are the left and right domains of the domains corresponding to the first subpixel electrode 191a. Thus, in an exemplary embodiment, 2<D1/D2<10.

As described above, the total area (D3) of the fifth domain and the sixth domain, which are the upper and lower domains of the domains corresponding to the second subpixel electrode 191b charged with the relatively low voltage as the low subpixel, may be greater than about half and less than about four times the total area (D4) of the seventh domain and the eighth domain, which are the left and right domains of the domains corresponding to the second subpixel electrode 191b. Thus, in an exemplary embodiment, 0.5<D3/D4<4.

As described above, an area ratio of the left and right domains and the upper and lower domains of the domains corresponding to the first subpixel electrode 191a and the second subpixel electrode 191b are predetermined, and the side visibility is thereby improved throughout all gray levels and a reduction of color reproducibility of the screen is effectively prevented.

Figure 7:
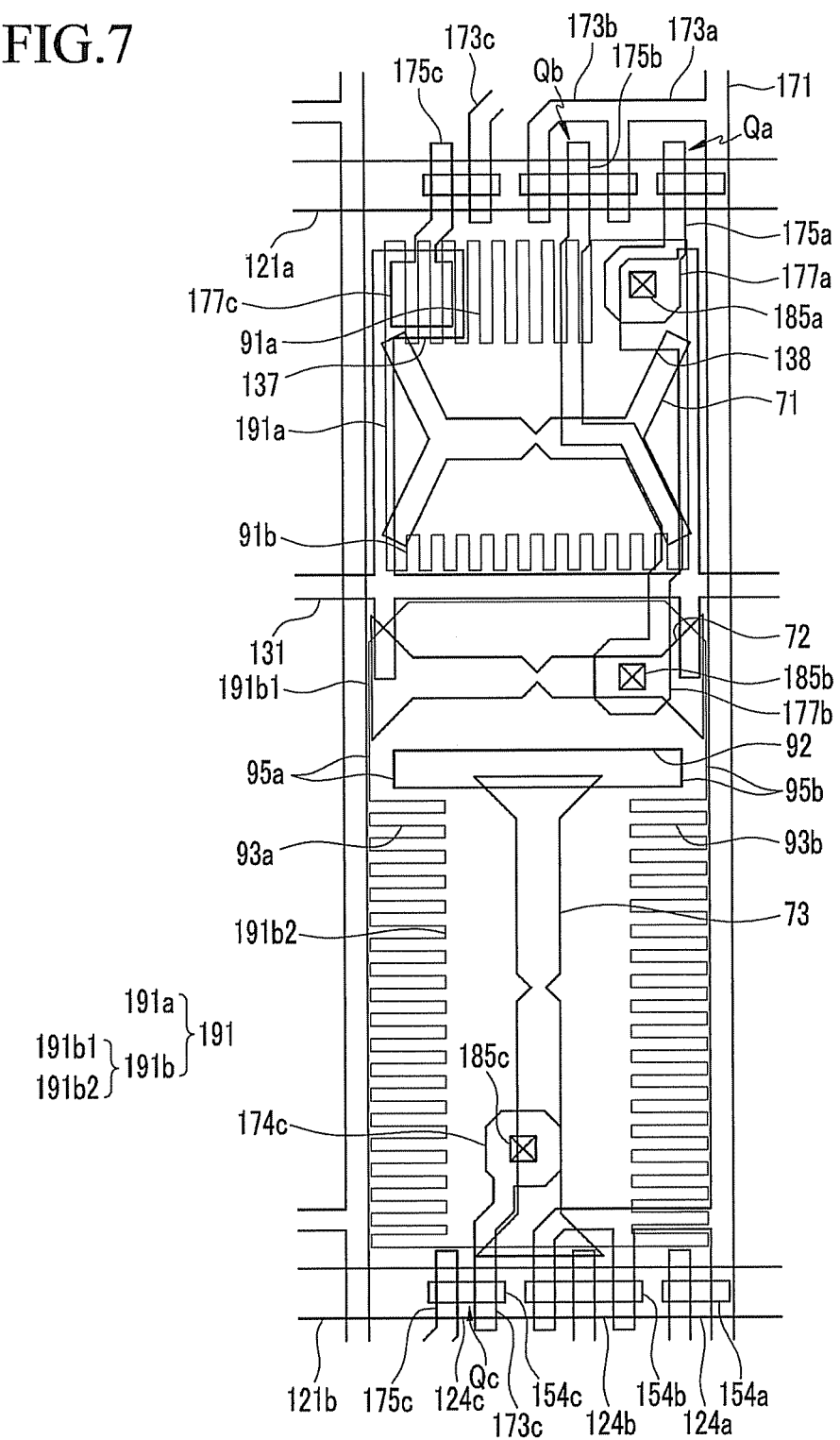
FIG. 7 is a plan view of another exemplary embodiment of a liquid crystal display according to the present invention.

FIG. 7 is a plan view of another exemplary embodiment of the liquid crystal display according to the present invention.

The liquid crystal display in FIG. 7 is substantially the same as the liquid crystal displays in FIGS. 3 to 5 except for the shape of the first domain division member 71. The same or like elements shown in FIG. 7 have been labeled with the same reference characters as used above to describe the exemplary embodiments of the liquid crystal display shown in FIGS. 3 to 5, and any repetitive detailed description thereof will hereinafter be omitted or simplified.

As shown in FIG. 7, the first domain division member 71 of the common electrode 270 has branches disposed at each ends thereof and separated from each other. The total area of the left and right domains of the domains between a data line 171 and the first domain division member 71 may be determined by the branches.

Figure 8:
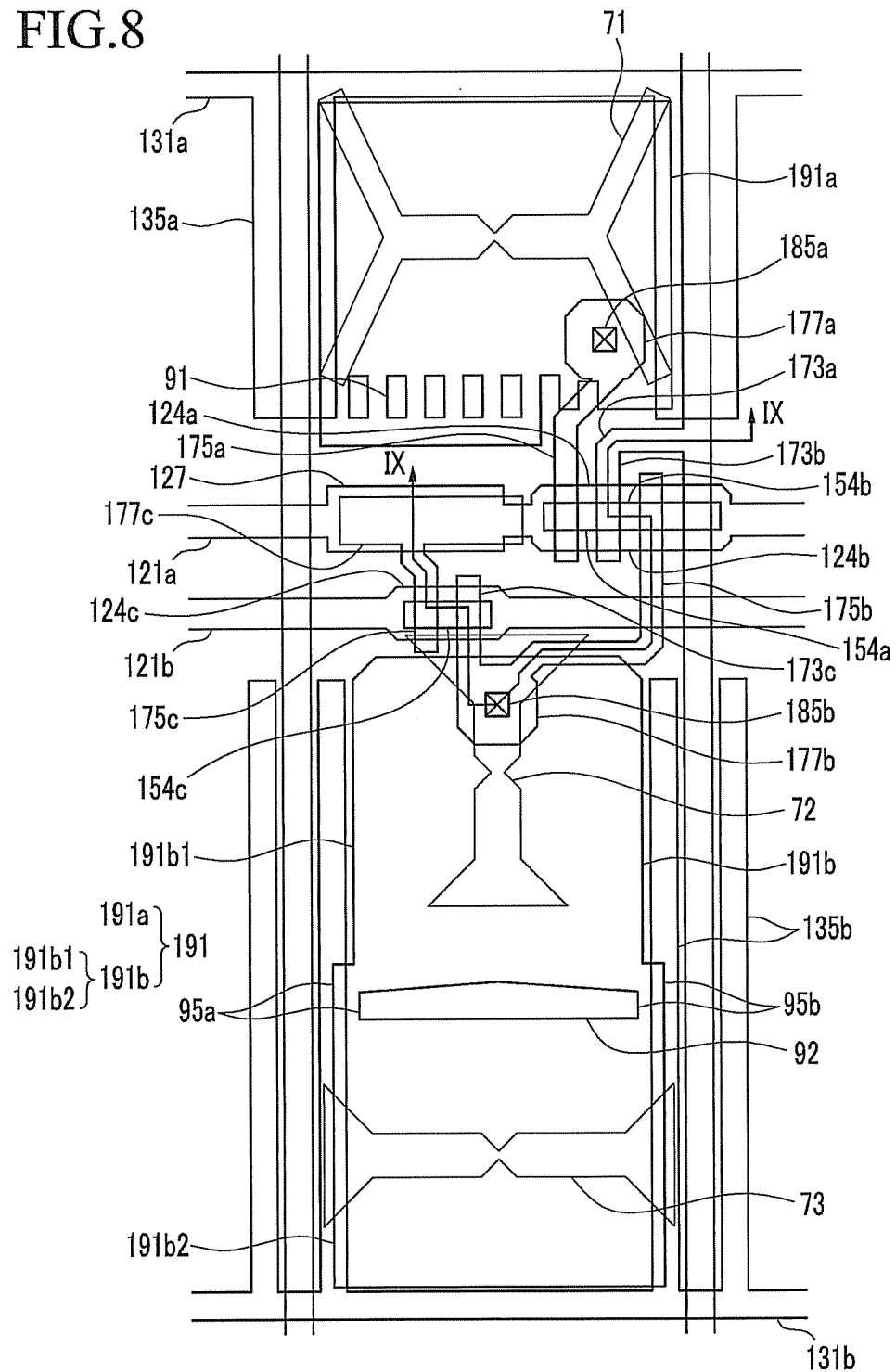
FIG. 8 is a plan view of another exemplary embodiment of a liquid crystal display according to the present invention.

Hereinafter, still another exemplary embodiment of the liquid crystal display will be described with reference to FIGS. 8 and 9. FIG. 8 is a plan view of another exemplary embodiment of the liquid crystal, and FIG. 9 is a partial cross-sectional view taken along line IX-IX of FIG. 8.

Figure 9:
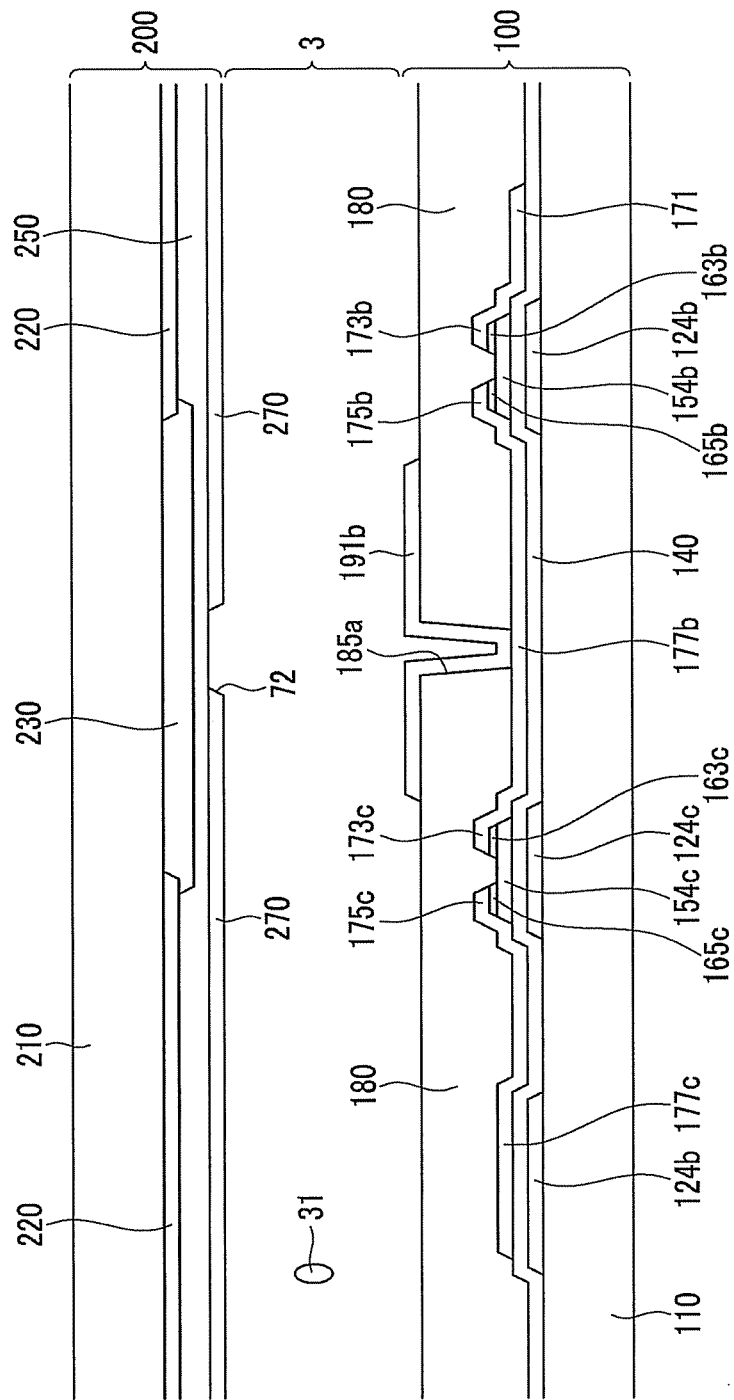
FIG. 9 is a partial cross-sectional view taken along line IX-IX of FIG. 8.

The layered structure of the liquid crystal display of FIGS. 8 and 9 is substantially the same as the layered structure the liquid crystal display in FIGS. 3 to 5. The same or like elements shown in FIGS. 8 and 9 have been labeled with the same reference characters as used above to describe the exemplary embodiments of the liquid crystal display shown in FIGS. 3 to 5, and any repetitive detailed description thereof will hereinafter be omitted or simplified.

Referring to the lower panel 100, a first gate line 121a, a second gate line 121b and storage electrode lines 131a and 131b including storage electrodes 135a and 135b are disposed on an insulation substrate 110, and a gate insulating layer 140 is disposed on the first and second gate lines 121a and 121b and the storage electrode lines 131a and 131b. Semiconductor islands 154a, 154b and 154c and ohmic contacts 163b, 163c, 165b and 165c are formed on the gate insulating layer 140. A data line 171 including a first source electrode 173a and a second source electrode 173b, a first drain electrode 175a including a wide end portion 177a and a second drain electrode 175b including a wide end portion 177b, and a third source electrode 173c connected to the second drain electrode 175b and a third drain electrode 175c including a wide end portion 177c are disposed on the ohmic contacts 163b, 163c, 165b and 165c and the gate insulating layer 140. A passivation layer 180 having contact holes 185a, 185b and 185c is disposed on the data line 171, the first drain electrode 175a and the third source electrode 173c, and a pixel electrode 191 including a first subpixel electrode 191a and a second subpixel electrode 191b is disposed on the passivation layer 180.

As shown in FIGS. 8 and 9, the first gate line 121a includes a first gate electrode 124a, a second gate electrode 124b and a capacitor electrode 127, and the step-down capacitor Cd is formed by overlapping the capacitor electrode 127 of the first gate line 121a and the wide end portion 177c of the third drain electrode 175c via the gate insulating layer 140 interposed therebetween. Accordingly, in an exemplary embodiment the capacitor electrode line of the step-down capacitor Cd may be omitted, and the aperture ratio of the liquid crystal display is thereby substantially increased.

In an exemplary embodiment, the first and second gate lines 121a and 121b and the thin film transistors are disposed between the first subpixel electrode 191a and the second subpixel electrode 191b such that the area of a region corresponding to the drain electrode may be substantially reduced, and the aperture ratio of the liquid crystal display is thereby substantially increased.

In an exemplary embodiment, the storage electrode lines 131a and 131b are disposed above and below the pixel area, respectively, and the storage capacitance is thereby substantially increased and light leakage is effectively prevented above and below the pixel area.

Figure 10:
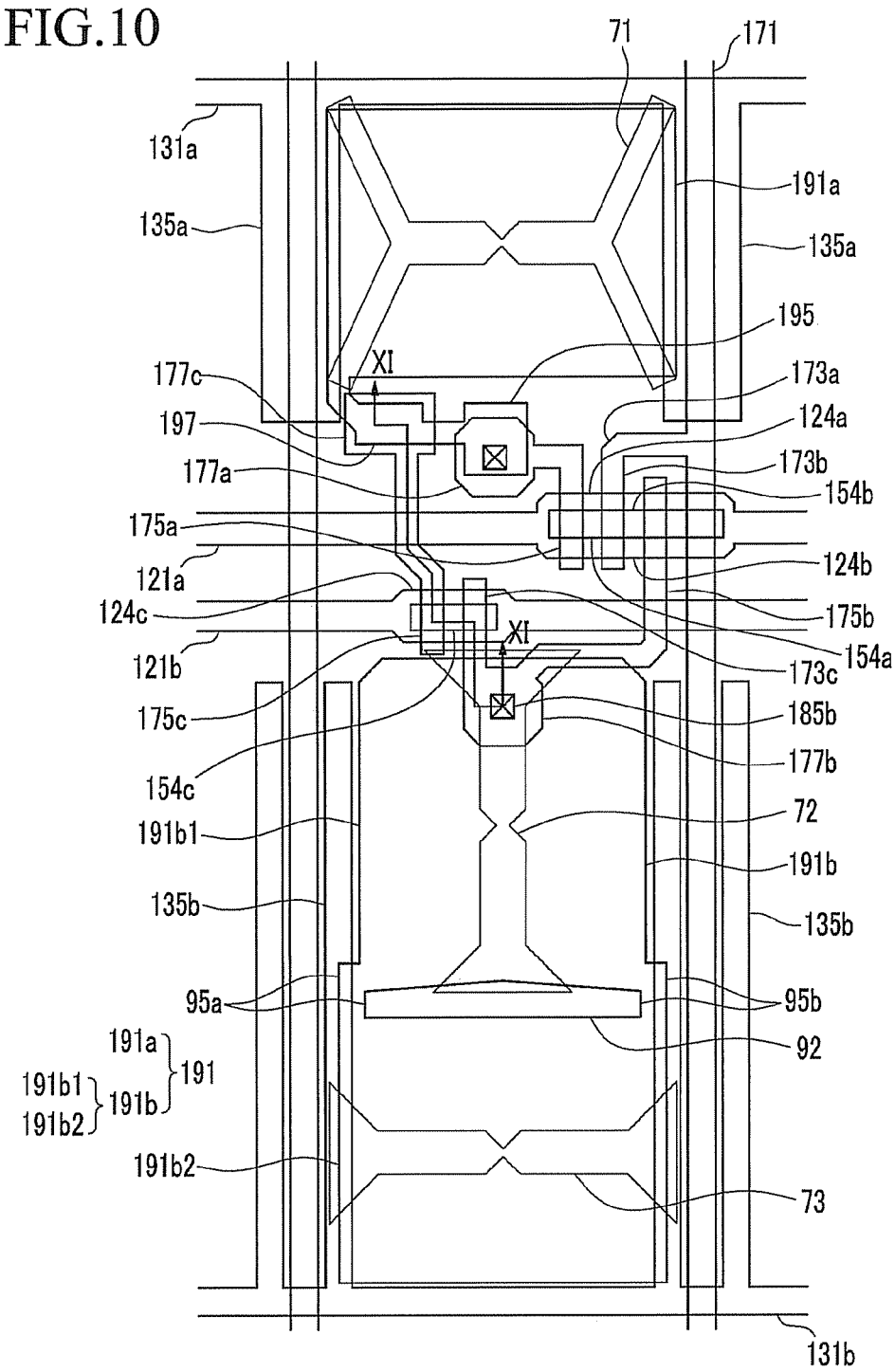
FIG. 10 is a plan view of another exemplary embodiment of a liquid crystal display according to the present invention.

Another exemplary embodiment of the liquid crystal will now be described in further detail with reference to FIGS. 10 to 12. FIG. 10 is a plan view of a liquid crystal display, FIG. 11 is a partial cross-sectional view taken along line XI-XI of FIG. 10 and FIG. 12 is a schematic circuit diagram of another exemplary embodiment of a pixel of a liquid crystal display.

Figure 11:
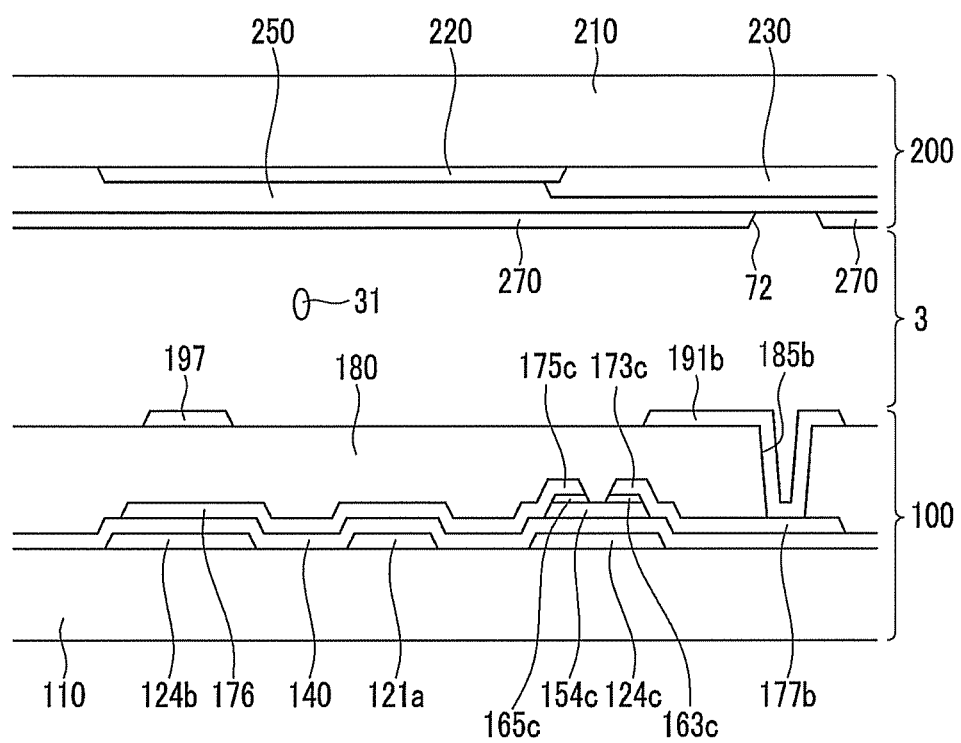
FIG. 11 a partial cross-sectional view taken along line XI-XI of FIG. 10.
Figure 12:
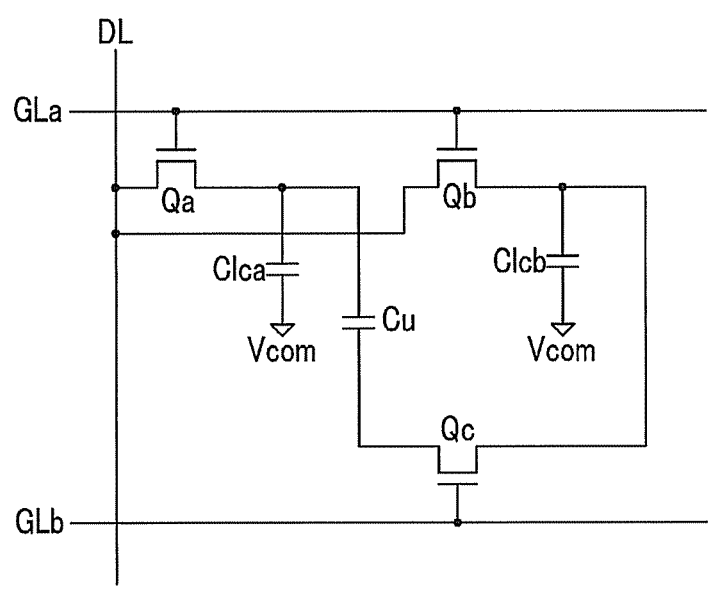
FIG. 12 is a schematic circuit diagram of another exemplary embodiment of a pixel of a liquid crystal display according to the present invention.

The layered structure of the liquid crystal display of FIGS. 10 and 11 is similar to the layered structure of the liquid crystal display of FIGS. 3 to 5 except that the first gate line 121a includes a first gate electrode 124a and a second gate electrode 124b, and the second gate line 121b includes a third gate electrode 124c. The same or like elements shown in FIGS. 10 and 11 have been labeled with the same reference characters as used above to describe the exemplary embodiments of the liquid crystal display in FIGS. 3 to 5, and any repetitive detailed description thereof will hereinafter be omitted or simplified.

Referring to a lower panel 100, a first gate line 121a, a second gate line 121b and storage electrode lines 131a and 131b including storage electrodes 135a and 135b are disposed on an insulation substrate 110, and a gate insulating layer 140 is disposed on the first and second gate lines 121a and 121b and the storage electrode lines 131a and 131b. Semiconductor islands 154a, 154b and 154c and ohmic contacts 163c and 165b are formed on the gate insulating layer. A data line 171 including a first source electrode 173a and a second source electrode 173b, a first drain electrode 175a including a wide end portion 177a, a second drain electrode 175b including a wide end portion 177b, a third source electrode 173c, and a third drain electrode 175c including a wide end portion 177c are disposed on the ohmic contacts 163b, 163c, 165b and 165c and the gate insulating layer 140. A passivation layer 180 including contact holes 185a, 185b and 185c is disposed on the data line 171, the first drain electrode 175a, the second drain electrode 175b, the third source electrode 173c and the third drain electrode 175c, and a pixel electrode 191 including a first subpixel electrode 191a and a second subpixel electrode 191b is disposed on the passivation layer 180.

As described above and shown in FIGS. 3 to 5, the first gate line 121a includes a first gate electrode 124a and a second gate electrode 124b, and the second gate line 121b includes a third gate electrode 124c.

In an exemplary embodiment, the first subpixel electrode 191a includes a capacitor electrode 197 extending toward the wide end portion 177c of the third drain electrode 175c. The liquid crystal display may include a step-up capacitor Cu instead of the step-down capacitor Cd, and the step-up capacitor Cu is formed by overlapping the wide end portion 177c of the third drain electrode 175c and the capacitor electrode 197 of the first subpixel electrode 191a via the passivation layer 180 disposed therebetween.

In an exemplary embodiment, the first and second gate lines 121a and 121b and the thin film transistors are disposed between the first subpixel electrode 191a and the second subpixel electrode 191b such that the area of the region corresponding to the drain electrode may be substantially reduced, and the aperture ratio of the liquid crystal display is thereby substantially increased.

In an exemplary embodiment, the storage electrode lines 131a and 131b may be disposed above and below the pixel area, and the storage capacitance is thereby substantially increased and light leakage from the above and below the pixel area is effectively prevented.

Hereinafter, an operation of the liquid crystal display will be described in further detail with reference to FIG. 12. The same or like elements shown in FIG. 12 have been labeled with the same reference characters as used above to describe the exemplary embodiments of the pixel of the liquid crystal display in FIG. 6, and any repetitive detailed description thereof will hereinafter be omitted or simplified.

As shown in FIG. 12, an exemplary embodiment of a pixel of the liquid crystal display includes the first, second and third switching elements Qa, Qb and Qc, the first and second liquid crystal capacitors Clca and Clcb, and a step-up capacitor Cu.

The first and second switching elements Qa and Qb are connected to the first gate line GLa and the data line DL, respectively, and the third switching element Qc is connected to the second gate line GLb.

The first and second switching elements Qa and Qb may be three terminal elements such as thin film transistors disposed in the lower panel 100, for example. Control terminals of the first and second switching elements Qa and Qb are connected to the first gates line GLa and input terminals of the first and second switching elements Qa and Qb are connected to the data line DL, an output terminal of the first switching element Qa is connected to the first liquid crystal capacitor Clca, and an output terminal of the second switching element Qb is connected to the second liquid crystal capacitor Clcb.

The third switching element Qc may be a three terminal element such as a thin film transistor disposed in the lower panel 100, for example, and includes a control terminal connected to one of the second gate lines GLb, an input terminal connected to the second liquid crystal capacitor Clcb and an output terminal connected to the step-up capacitor Cu.

The step-up capacitor Cu is connected to the output terminal of the third switching element Qc and the first liquid crystal capacitor Clca, and is formed by overlapping the output electrode of the third switching element Qc and the first subpixel electrode 191a via an insulator interposed therebetween.

A first gate signal is applied to the first gate line GLa, and a second gate signal is applied to the second gate line GLb. When the first gate signal shifts from the gate-off voltage to the gate-on voltage, the first and second switching elements Qa and Qb connected to the first gate line GLa are turned on. Accordingly, the data voltage applied to the data line DL is applied to the first and second subpixel electrodes PEa and PEb through the turned-on first and second switching elements Qa and Qb. In an exemplary embodiment, the data voltages applied to the first and second subpixel electrodes PEa and PEb may be identical to each other. The first and second liquid crystal capacitors Clca and Clcb may be charged with the same amount of electric charge according to a difference between the common voltage and the data voltage.

When the first gate signal shifts from the gate-on voltage to the gate-off voltage, and the second gate signal shifts from the gate-off voltage to the gate-on voltage, the first and second switching elements Qa and Qb are turned off, while the third switching element Qc is turned on. Accordingly, the charges are moved from the second subpixel electrode PEb to the third drain electrode 175c through the third switching element Qc. In an exemplary embodiment, the first subpixel electrode 191a, which is one terminal of the step-up capacitor Cu, is floated when the third thin film transistor Q3 is turned on. Accordingly, the charges are moved to the third drain electrode 175c, which is the other terminal of the step-up capacitor Cu, such that the electric potential of the third drain electrode 175c is increased, and the electric potential of the first subpixel electrode 191a is thereby increased. Accordingly, the charged voltage of the first liquid crystal capacitor Clca is increased.

In an exemplary embodiment, the charged voltage of the first liquid crystal capacitor Clca is substantially the same as the charged voltage of the second liquid crystal capacitor Clcb, and is different from the charged voltage of the second liquid crystal capacitor Clcb when the third thin film transistor Q3 is turned on. When the voltage of the first liquid crystal capacitor Clca is different from the voltage of the second liquid crystal capacitor Clcb, the inclination angles of the liquid crystal molecules are different from each other in regions corresponding to the first subpixel and the second subpixel, and the luminance of the two subpixels are thereby different. Therefore, the voltages of the first and second liquid crystal capacitors Clca and Clcb may be determined to make an image viewed from the side be similar to an image viewed from the front, and to improve the side visibility.

As described above, in an exemplary embodiment, the total area (D1) of the first domain and the second domain, which are the upper and lower domains of the domains corresponding to the first subpixel electrode 191a charged with the relatively high voltage as a high subpixel, may be greater than about twice and less than about ten times the total area (D2) of the third domain and the fourth domain, which are the left and right domains of the domains corresponding to the first subpixel electrode 191a. Thus, in an exemplary embodiment, $2<D1/D2<10$.

As described above, the total area (D3) of the fifth domain and the sixth domain, which are the upper and lower domains of the domains corresponding to the second subpixel electrode 191b charged with the relatively low voltage as a low subpixel, may be greater than about half and less than about four times the total area (D4) of the seventh domain and the eighth domain, which are the left and right domains of the domains corresponding to the second subpixel electrode 191b. Thus, in an exemplary embodiment, $0.5<D3/D4<4$.

As described herein, the area ratios of the left and right domains and the upper and lower domains of the first subpixel electrode 191a and the second subpixel electrode 191b may be determined such that the side visibility is substantially improved throughout all gray levels, and a reduction of the color reproducibility of the screen is effectively prevented.

Figure 13:
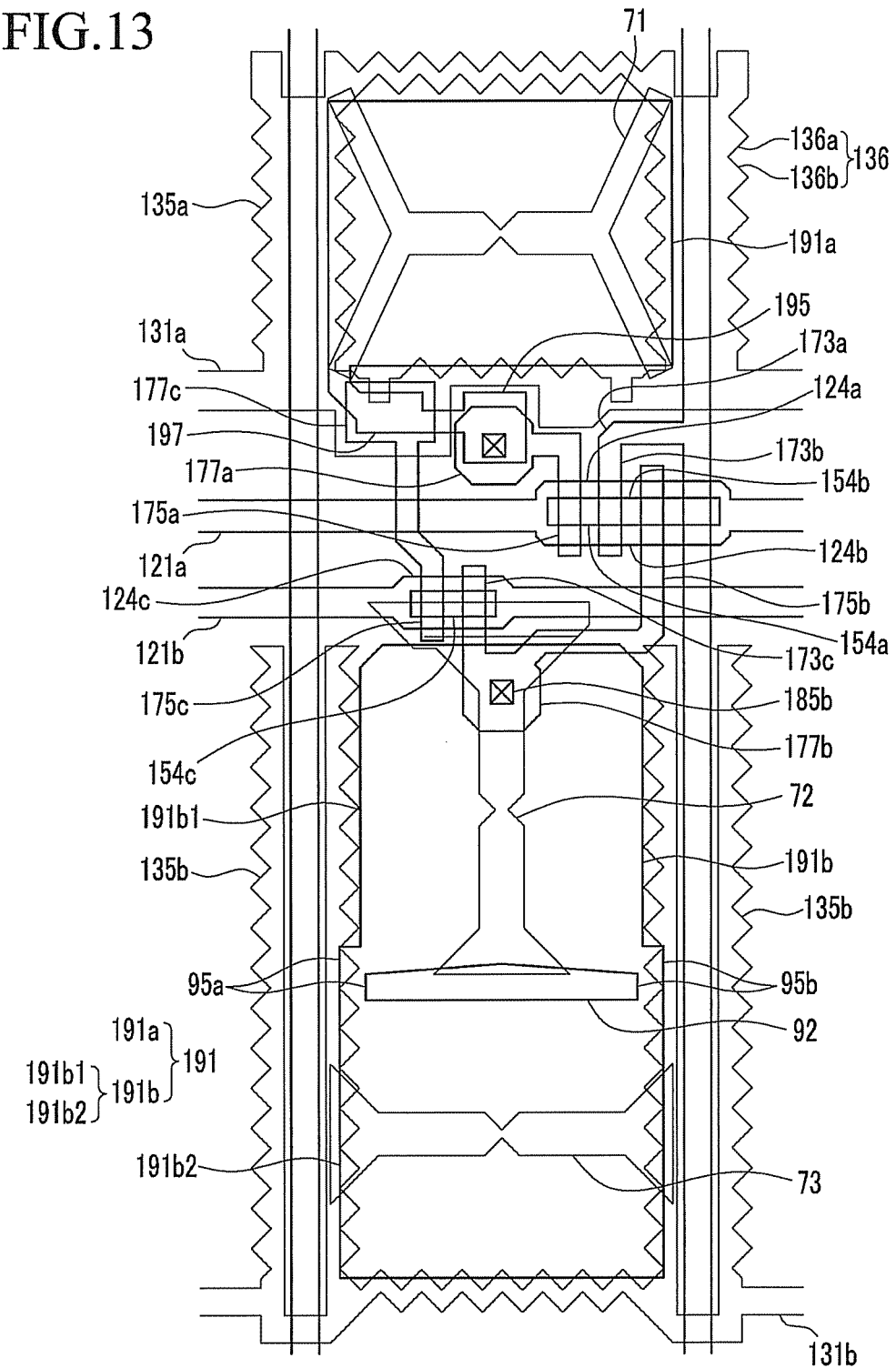
FIG. 13 is a plan view of yet another exemplary embodiment of a liquid crystal display according to the present invention.

Hereinafter, yet another exemplary embodiment of a liquid crystal display will be described in further detail with reference to FIG. 13. FIG. 13 is plan view of another exemplary embodiment of a liquid crystal display.

The liquid crystal display in FIG. 13 is similar to the exemplary embodiment of the liquid crystal display in FIGS. 10 and 11 except that storage electrode lines 131a and 131b and storage electrodes 135a and 135b of the liquid crystal display include an oblique portion 136 including a first oblique portion 136a and a second oblique portion 136b forming an angle of about 45 degrees with the first and second gate lines 121a and 121b. The same or like elements shown in FIG. 13 have been labeled with the same reference characters as used above to describe the exemplary embodiments of the liquid crystal display in FIGS. 10 and 11, and any repetitive detailed description thereof will hereinafter be omitted or simplified.

As described above, the storage electrode lines 131a and 131b and the storage electrodes 135a and 135b include the oblique portion 136 including the first oblique portion 136a and the second oblique portion 136b forming an angle of about 45 degrees with the first and second gate lines 121a and 121b. The first oblique portion 136a and the second oblique portion 136b form about right angles and are alternately disposed, and thereby form a sawtooth-like shape. The edge of the oblique portion 136 is substantially parallel to the polarization axis of the polarizer, and the edge of the pixel area is thereby substantially parallel to the polarization axis of the polarizer, and thus, light leakage is effectively prevented at the edge of the pixel area, and texture that may be generated at the edge of the pixel area can be prevented.

Figure 14A:
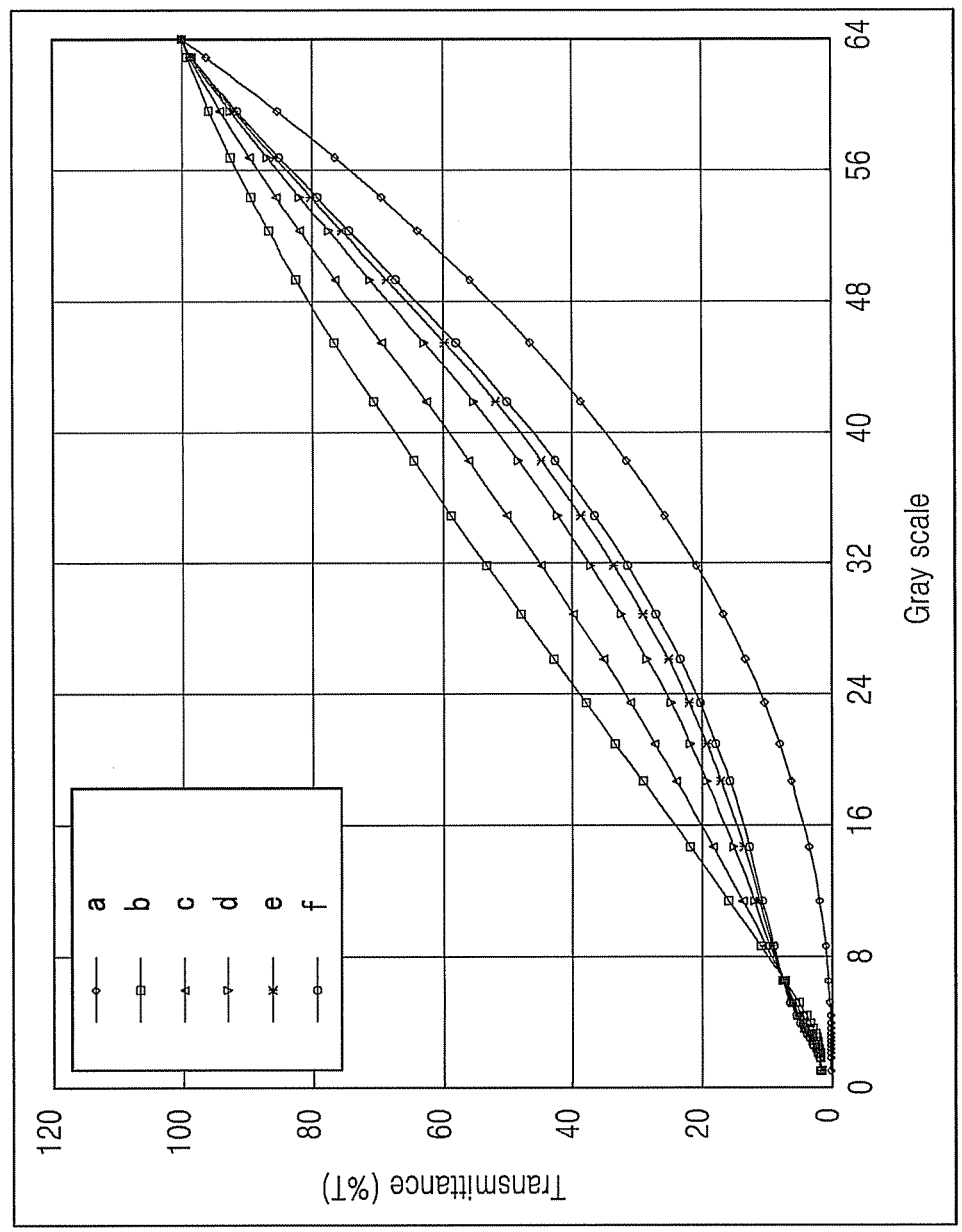
FIGS. 14A to 14C are graphs of transmittance versus gray scale number showing a gamma curve of experimental examples of the present invention.
Figure 14B:
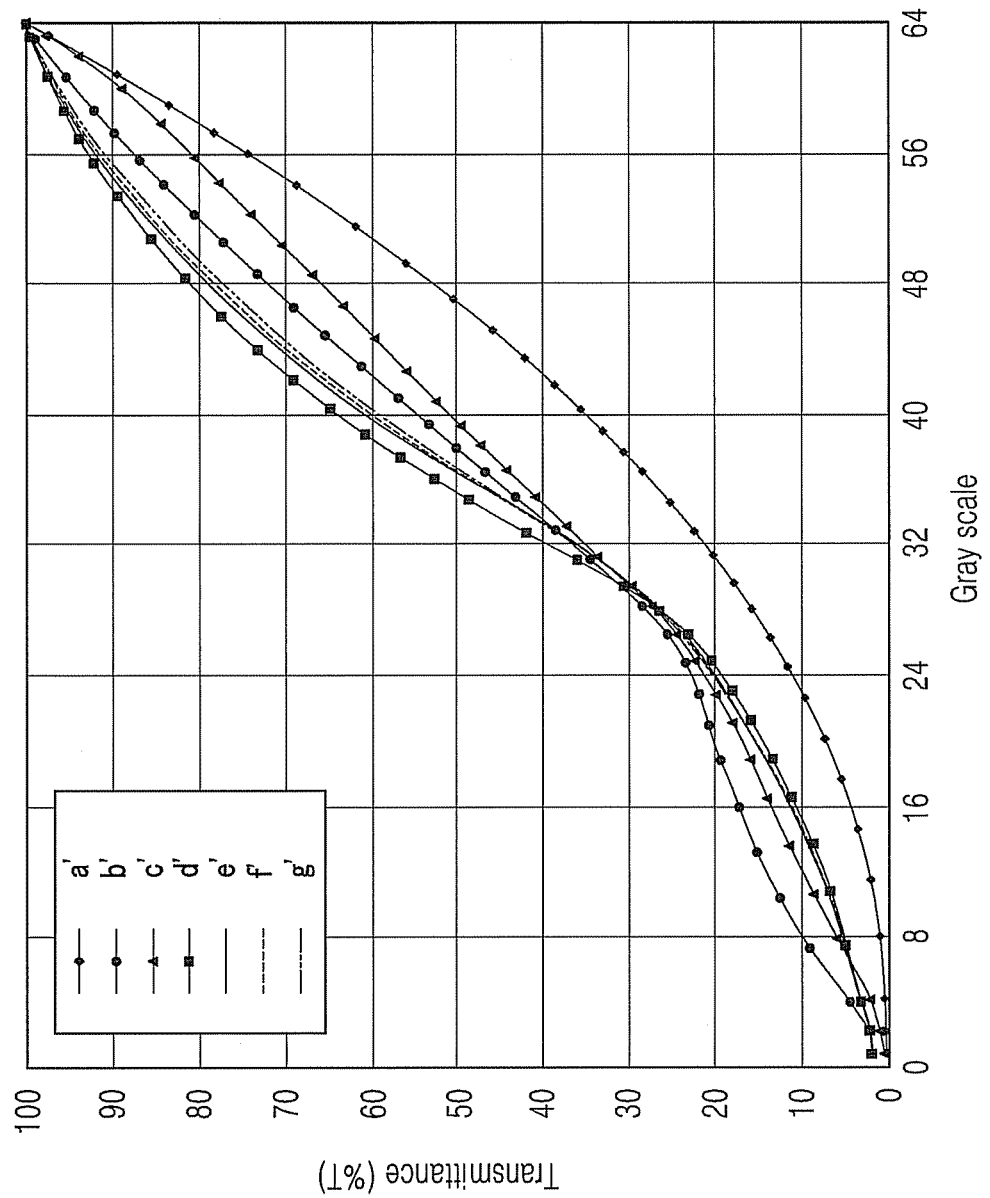
Figure 14C:
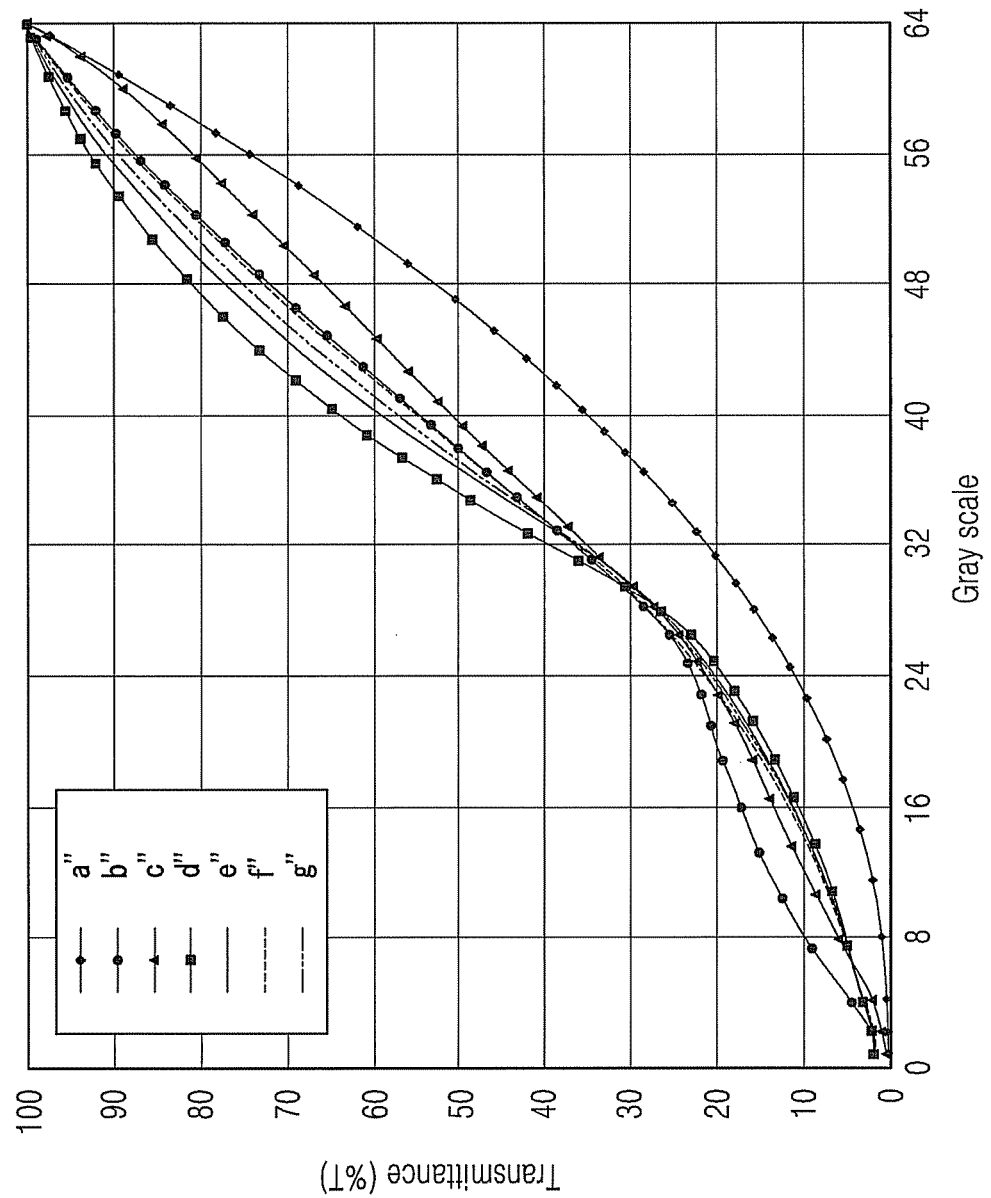

Hereinafter, gamma curves according to exemplary embodiments of the liquid crystal displays will be described with reference to FIGS. 14A to 14C. FIGS. 14A to 14C are graphs of transmittance (% T) versus gray scale level of exemplary embodiments of a liquid crystal display.

The exemplary embodiments of the liquid crystal display used to measure gamma curves in FIG. 14A are similar to each other except the area ratio of the upper and lower domains and the left and right domains of the high subpixel. In FIG. 14A, a front gamma curve of an exemplary embodiment of the liquid crystal display is referred to as (a), a side gamma curve of an exemplary embodiment of the liquid crystal display, in which the area ratio of the upper and lower domains and the left and right domains of the high subpixel is 1:1, is referred to as (b), a side gamma curve of an exemplary embodiment of the liquid crystal display, in which the area ratio of the upper and lower domains and the left and right domains of the high pixel is 2:1, is referred to as (c), a side gamma curve of an exemplary embodiment, in which the area ratio of the upper and lower domains and the left and right domains of the high subpixel is 4:1, is referred to as (d), a side gamma curve of an exemplary embodiment of liquid crystal display, in which the area ratio of the up and down domains and the left and right domains of the high subpixel is 6:1, is referred to as (e), and a side gamma curve of an exemplary embodiment of the liquid crystal display, in which the area ratio of the upper and lower domains and the left and right domains of the high subpixel is 8:1, is referred to as (f).

Referring again to FIG. 14A, the gamma curves of the side view of the liquid crystal displays are changed close toward the front gamma curve of the liquid crystal display as the area ratio of the upper and lower domains and the left and right domains of the high subpixel is increased from 2:1 to 8:1. However, a distortion is generated at a low gray scale level as the area ratio of the upper and lower domain and the left and right domains of the high subpixel is increased. In an exemplary embodiment, the area ratio of the upper and lower domain and the left and right domains of the high subpixel may be less than 10:1 to decrease the distortion.

Gamma curves of exemplary embodiments of the liquid crystal display shown in FIGS. 14B and 14C are similar to each other except for the area ratio of the upper and lower domains and the left and right domains of the low subpixel. In FIG. 14B, the front gamma curve of an exemplary embodiment of the liquid crystal display is refereed to as (a'), the upside gamma curve of the liquid crystal display is referred to as (b'), the downside gamma curve of the liquid crystal display is referred to as (c'), a side gamma curve of an exemplary embodiment of the liquid crystal display, in which the area ratio of the upper and lower domains and the left and right domains of the low subpixel is 0.5:1, is referred to as (d'), a side gamma curve of an exemplary embodiment of the liquid crystal display, in which the area ratio of the upper and lower domains and the left and right domains of the low subpixel, is 0.8:1, is referred to as (e'), a side gamma curve of an exemplary embodiment of the liquid crystal display, in which the area ratio of the upper and lower domains and the left and right domains of the low subpixel is 1.01:1, is referred to as (f), and a side gamma curve of an exemplary embodiment of the liquid crystal display, in which the area ratio of the upper and lower domains and the left and right domains of the low subpixel is 1.18:1, is referred to as (g'). In FIG. 14C, a side gamma curve of an exemplary embodiment of the liquid crystal display, in which the area ratio of the upper and lower domains and the left and right domains of the low subpixel is 1.18:1, is referred to as (e"), a side gamma curve of an exemplary embodiment of the liquid crystal display, in which the area ratio of the upper and lower domains and the left and right domains of the low subpixel is 1.8:1, is referred to as (f'), and a side gamma curve of an exemplary embodiment of the liquid crystal display, in which the area ratio of the upper and lower domains and the left and right domains of the low subpixel is 2.0:1, is referred to as (g").

As shown in FIGS. 14B and 14C, the gamma curve of side views of the liquid crystal display is changed close toward the front gamma curve of the liquid crystal display as the area ratio of the upper and lower domains and the left and right domains of the low subpixel is increased from 0.8:1 to 2.0:1. Particularly, the change of the gamma curve is greater at a middle gray and a high gray. In an exemplary embodiment, when the area ratio of the upper and lower domains and the left and right domains of the low subpixel is increased to 4.0:1, yellow discolored view from the left and right directions is increased.

In an exemplary embodiment, when the total area (D1) of the first domain and the second domain, which are the upper and lower domains of the domains corresponding to the first subpixel electrode 191a charged with the relatively high voltage as the high subpixel, is greater than about twice and less than about ten times the total area (D2) of the third domain and the fourth domain, which are the left and right domains of the domains corresponding to the first subpixel electrode 191a, and the total area (D3) of the fifth domain and the sixth domain, which are the upper and lower domains of the domains corresponding to the second subpixel electrode 191b charged with the relatively low voltage as the low subpixel, is greater than about half and less than about four times the total area (D4) of the seventh domain and the eighth domain, which are the left and right domains of the domains corresponding to the second subpixel electrode 191b, the side gamma curve of the liquid crystal display may be close to the front gamma curve and the distortion of the gamma curve or the yellow colored view are effectively prevented.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims

What is claimed is:

1. A liquid crystal display comprising:
a signal line disposed on a substrate;
a pixel electrode connected to the signal line and including a first subpixel electrode and a second subpixel electrode separated from the first subpixel electrode;
a common electrode disposed opposite the pixel electrode; and
a liquid crystal layer disposed between the pixel electrode and the common electrode,
wherein the liquid crystal layer is divided into domains including a first direction domain and a second direction domain in a region corresponding to the first subpixel electrode, and a third direction domain and a fourth direction domain in a region corresponding to the second subpixel electrode, and
an area of the first direction domain is greater than about twice and less than about ten times an area of the second direction domain.

2. The liquid crystal display of claim 1, wherein
the first direction domain is one of an upper domain and a lower domain of the domains, and
the second direction domain is one of a left domain and a right domain of the domains.

3. The liquid crystal display of claim 1, wherein
an area of the third direction domain is greater than about half and less than about four times an area of the fourth direction domain.

4. The liquid crystal display of claim 1, wherein
the third direction domain is one of an upper domain and a lower domain of the domains, and
the fourth direction domain is one of a left domain and a right domain of the domains.

5. The liquid crystal display of claim 1, wherein
a voltage charged between the first subpixel electrode and the common electrode is greater than a voltage charged between the second subpixel electrode and the common electrode.

6. The liquid crystal display of claim 1, further comprising a step-down capacitor, wherein a terminal of the step-down capacitor is connected to an output terminal of the switching element connected to the second subpixel electrode.

7. The liquid crystal display of claim 6, wherein
the first subpixel electrode and the second subpixel electrode are separated from each other, and
the switching element and the step-down capacitor connected to the second subpixel electrode are disposed between the first subpixel electrode and the second subpixel electrode.

8. The liquid crystal display of claim 1, further comprising a step-up capacitor, wherein
a first terminal of the step-up capacitor is connected to an output terminal of the switching element connected to the second subpixel electrode, and
a second terminal of the step-up capacitor is connected to the first subpixel electrode.

9. The liquid crystal display of claim 8, wherein
the first subpixel electrode and the second subpixel electrode are separated from each other, and
the switching element connected to the second subpixel electrode is disposed between the first subpixel electrode and the second subpixel electrode.

10. The liquid crystal display of claim 1, wherein
the common electrode includes a domain division member.

11. The liquid crystal display of claim 10, wherein
the domain division member of the common electrode includes a first domain division member corresponding to the first subpixel electrode and a second domain division member corresponding to the second subpixel electrode,
the first domain division member includes a first stem dividing the first subpixel electrode into an upper portion and a lower portion and a branch extending from the first stem, and
the first branch forms an angle of about 45 degrees with the first stem.

12. The liquid crystal display of claim 11, wherein
the second subpixel electrode includes a third domain division member,
the second domain division member includes a first portion and a second portion corresponding to the lower portion and the upper portion of the second subpixel electrode, respectively,
the first portion of the second domain division member includes a second stem dividing the second subpixel electrode into an upper portion and a lower portion, and
the second portion of the second domain division member includes a third stem dividing the second subpixel electrode into a left portion and a right portion.

13. The liquid crystal display of claim 1, further comprising
a storage electrode extending along an edge of the first subpixel electrode and an edge of the second subpixel electrode.

14. A liquid crystal display comprising:
a signal line disposed on a substrate;
a pixel electrode connected to a signal line and including a first subpixel electrode and a second subpixel electrode separated from the first subpixel electrode;
a common electrode disposed opposite the pixel electrode; and
a liquid crystal layer disposed between the pixel electrode and the common electrode,
wherein the liquid crystal layer is divided into domains including a first direction domain and a second direction domain in a region corresponding to the first subpixel electrode, and a third direction domain and a fourth direction domain in a region corresponding to the second subpixel electrode, and
an area of the third direction domain is greater than about half and less than about four times an area of the fourth direction domain.

15. The liquid crystal display of claim 14, wherein
the third direction domain is one of an upper domain and a lower domain of the domains, and
the fourth direction domain is one of a left domain and a right domain of the domains.

16. The liquid crystal display of claim 15, wherein
the first direction domain is one of an upper domain and a lower domain of the domains, and
the second direction domain is one of a left domain and a right domain of the domains.

17. The liquid crystal display of claim 14, wherein
a voltage charged between first subpixel electrode and the common electrode is greater than a voltage charged between the second subpixel electrode and the common electrode.

18. The liquid crystal display of claim 14, wherein
the common electrode includes a domain division member,
the domain division member of the common electrode comprises:
a first domain division member corresponding to the first subpixel electrode; and
a second domain division member corresponding to the second subpixel electrode,
the first domain division member includes a first stem dividing the first subpixel electrode into an upper portion and a lower portion and a branch extending from the first stem, and
the first branch forms an angle of about 45 degrees with the first stem.

19. The liquid crystal display of claim 18, wherein
the second subpixel electrode includes a third domain division member,
the second domain division member includes a first portion and a second portion corresponding to the lower portion and the upper portion of the second subpixel electrode, respectively,
the first portion of the second domain division member includes a second stem dividing the second subpixel electrode into an upper portion and a lower portion, and
the second portion of the second domain division member includes a third stem dividing the second subpixel electrode into a left portion and a right portion.

\* \* \* \* \*